(12) United States Patent
Roberts et al.

(10) Patent No.: US 11,167,607 B2
(45) Date of Patent: Nov. 9, 2021

(54) BODY PROP ASSEMBLY

(71) Applicant: Global Vacuum Systems, Navasota, TX (US)

(72) Inventors: Landon Roberts, Navasota, TX (US); Leland Carl Sutton, Jr., Navasota, TX (US)

( * ) Notice: Subject to any disclaimer, the term of this patent is extended or adjusted under 35 U.S.C. 154(b) by 489 days.

(21) Appl. No.: 15/900,761

(22) Filed: Feb. 20, 2018

(65) Prior Publication Data

US 2018/0236831 A1 Aug. 23, 2018

Related U.S. Application Data

(60) Provisional application No. 62/461,182, filed on Feb. 20, 2017.

(51) Int. Cl.

| | | |
|---|---|---|
| *B60D 1/66* | (2006.01) | |
| *B60P 1/04* | (2006.01) | |
| *B60P 1/28* | (2006.01) | |
| *B60P 3/22* | (2006.01) | |
| *B60D 1/46* | (2006.01) | |
| *B60D 1/50* | (2006.01) | |
| *B60S 9/16* | (2006.01) | |

(52) U.S. Cl.
CPC .............. *B60D 1/465* (2013.01); *B60D 1/50* (2013.01); *B60D 1/665* (2013.01); *B60P 1/04* (2013.01); *B60S 9/16* (2013.01)

(58) Field of Classification Search
CPC ...... B60S 9/16; B60S 9/18; B60S 9/22; B60P 1/04; B60P 1/283; B60P 3/224; B65D 88/20; B65D 88/128; B65D 88/56; B65D 2251/04; B28C 7/0084

USPC ....... 414/776, 777, 779, 782, 639, 648, 642, 414/674; 254/88, 114; 108/6, 7, 9, 10; 298/17 B

See application file for complete search history.

(56) References Cited

U.S. PATENT DOCUMENTS

| | | | | |
|---|---|---|---|---|
| 296,938 | A | * | 4/1884 | Dees |
| 1,264,432 | A | * | 4/1918 | Palm ........................ B60P 1/34 298/11 |
| 2,407,012 | A | * | 9/1946 | Hutchinson ............. B60P 1/283 298/22 R |

(Continued)

FOREIGN PATENT DOCUMENTS

| | | | | |
|---|---|---|---|---|
| DE | 1480147 A1 | * | 9/1969 | ............. B60P 1/283 |
| GB | 847163 | * | 9/1960 | ............. B60P 1/283 |
| JP | 58183325 | * | 10/1983 | ............. B60P 1/283 |

*Primary Examiner* — Anne Marie M Boehler
(74) *Attorney, Agent, or Firm* — Shannon Warren

(57) ABSTRACT

A body prop assembly for supporting portions of a tilting trailer assembly. Said body prop assembly comprising a body prop, a hinge assembly, two sidetracks. Said body prop assembly configured to attach to said tilting trailer assembly between tilting portions and a trailer platform. Said tilting portions selectively rotate with respect to said trailer platform on a tilting hinge. Said tilting hinge defines a tilting axis of said tilting trailer assembly. Said body prop is configured to selectively hold a portion of said tilting portions at an incline. Lower guides are configured to slide through portions of said two sidetracks in order to adjust a lower portion of said body prop assembly. Said body prop comprises an upper portion, a side portions and said lower guides. Said upper portion is substantially parallel with said lower guides.

18 Claims, 25 Drawing Sheets

(56) References Cited

U.S. PATENT DOCUMENTS

| | | | | |
|---|---|---|---|---|
| 3,272,558 A * | 9/1966 | Rathman | ............... | B60P 1/20 |
| | | | | 298/22 D |
| 3,455,475 A * | 7/1969 | Suteau | ............... | B60P 3/2225 |
| | | | | 414/787 |
| 3,730,396 A * | 5/1973 | Harper | ............... | B28C 7/0084 |
| | | | | 222/166 |
| 3,792,814 A * | 2/1974 | Platz | ............... | A01C 23/047 |
| | | | | 239/149 |
| 4,202,434 A * | 5/1980 | Herron | ............... | B65G 41/002 |
| | | | | 198/316.1 |
| 4,218,094 A * | 8/1980 | Leaver | ............... | B60P 1/04 |
| | | | | 248/351 |
| 4,480,871 A * | 11/1984 | Fox | ............... | B60P 1/16 |
| | | | | 298/17 R |
| 5,267,780 A * | 12/1993 | Friesen | ............... | B60P 1/04 |
| | | | | 298/17 B |
| 5,405,181 A * | 4/1995 | Watkins | ............... | B60P 1/283 |
| | | | | 298/17 B |
| 6,745,869 B2 * | 6/2004 | Garrett | ............... | B23D 45/003 |
| | | | | 182/45 |

* cited by examiner

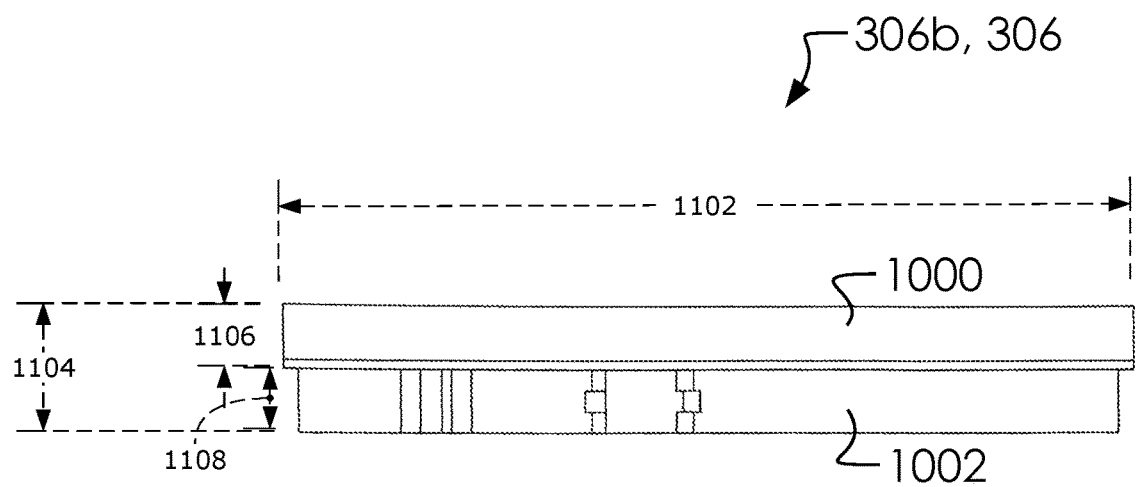
FIG. 11A
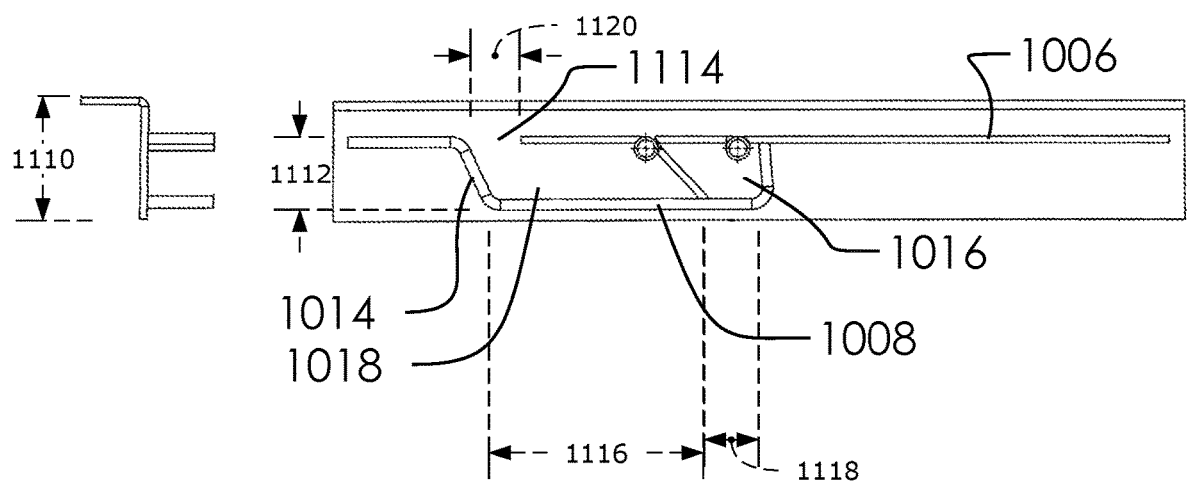
FIG. 11B
FIG. 11C

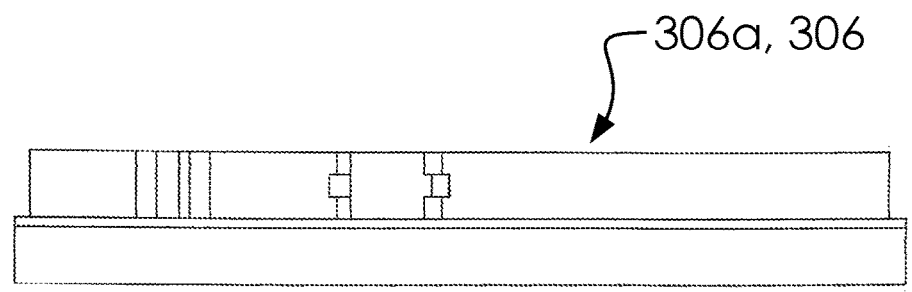
FIG. 13A
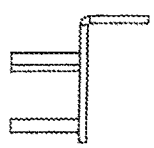
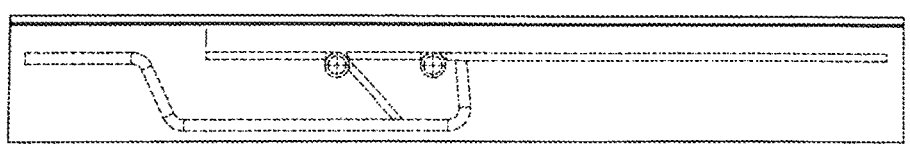
FIG. 13B
FIG. 13C

BODY PROP ASSEMBLY

CROSS-REFERENCE TO RELATED APPLICATIONS

This application claims benefit to U.S. Patent Application Number(s) 62/461,182 filed on Feb. 20, 2017.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

The current system is configured to be used on a vacuum truck or other truck with a tilting mechanism for dumping liquids or other contents. In the preferred embodiment, it may be used with a vacuum truck but the system is not limited to such use.

A vacuum truck or vacuum tanker is a type of tank truck that has a pump designed to pneumatically load liquids, sludges (such as fecal sludge) or slurries so that the material can be transported to a treatment or disposal site. They are mainly used to transport sanitary waste (human excreta mixed with water, e.g. from on-site septic tanks) as well as for some industrial liquids or slurries.

Design and Configurations

Commercial vacuum trucks which collect fecal sludge usually have a volume of 10-55 cubic meters. However various smaller versions for specialized applications or low-resource settings can be found with tanks as small as 500 liters.

Pumps

They generally use a low-volume sliding vane pump or a liquid ring pump to create a negative air pressure. The use of diaphragm mud pumps is less common, but with the advantage of a simpler design and usually lower overall costs. The disadvantage is that mechanical parts come into contact with the sludge, which is not the case for the more common vacuum pumps.

The truck can be configured to be a direct belt drive, or a hydraulic drive system. There are two different ways to mount the pump: either directly on the truck with the vacuum drive powered by the truck motor, or on the trailer with an independent motor. The more complicated trailer mounted version allows the utilization of both the negative pressure suction side of the pump as well as the positive pressure side to pump sludge over longer distances or lift it higher into the tank.

Suction Hoses

The suction hoses are typically 2 to 4 inches (5.1 to 10.2 cm) in diameter with 3" or 3 inches (7.6 cm) being the norm. The possible length depends on various factors mainly related to the lift and other pressure losses; Rarely will it be possible to extend it more than 50 m.

An inherent suction limitations of all suction pumps is that can only lift a liquid through utilizing atmospheric pressure (for pure water the theoretical maximum lift is approximately 10.3 m (33.9 feet)). However due to the viscosity of sludge it is possible to mix air into it either by sucking close from the surface or adding air with a compressor through a separate hose. Through this the overall density of the sludge/air mixture can be reduced a bit below that of pure water and thus a somewhat higher lift (10-15 m) be reached under optimal conditions. Other factors effecting the possible lift and total length of the suction hose are that single stage vacuum pumps only reach an 85-90% partial vacuum and that small air leakages, pipe friction losses and the viscosity of the liquid further reduce the possible lift.

Uses

Vacuum trucks are used by town, and municipal, governments, and by commercial entities around the world.

Human Excreta

Several types of non-centralized sanitation systems are served by vacuum trucks. They are used to empty septage from cesspits, septic tanks, pit latrines and communal latrines, for street cleanup, for sewer clean out, and for individual septic systems. The trucks are used in the cleaning of sanitary sewer pumping stations. Vacuum trucks are used to empty portable toilets. In commercial aviation, vacuum trucks are used to collect waste from airplane toilets.

Vacuum trucks discharge these wastes to the sewer network, to a wastewater treatment plant, or—usually illegally, for example in many developing countries—into the environment. The latter practice, called "institutionalized open defecation", is dangerous since it constitutes a public health and environmental hazard.

Industrial Liquids

Vacuum trucks are used in the petroleum industry, for cleaning of storage tanks and spills. They are also an important part of drilling oil and natural gas wells, as they are located at the drilling site. Vacuum trucks are used to remove drilling mud, drilling cuttings, cement, spills, and for removal of brine water from production tanks. They dispose of this in sump pits, treatment plants or if within safe levels may be spread out in a farmer's field.

Others

Vacuum trucks are also used for exposing underground utilities. The ground is jetted with water, and the vacuum truck sucks up the muddy product. This exposes the buried utility without the possibility of damage, as would be possible if a digging machine were used (i.e. tractor backhoe, tracked or wheeled excavator, ditch witches).

Vacuum trucks can also be used for cleanup of contaminated soil.

No prior art is known to the Applicant. Nor are any known inventions and patents, taken either singularly or in combination, is seen to describe the instant disclosure as claimed.

None of the known inventions and patents, taken either singularly or in combination, is seen to describe the instant disclosure as claimed.

BRIEF SUMMARY OF THE INVENTION

A body prop assembly for supporting portions of a tilting trailer assembly. Said body prop assembly comprising a body prop, a hinge assembly, two sidetracks. Said body prop assembly configured to attach to said tilting trailer assembly between tilting portions and a trailer platform. Said tilting portions selectively rotate with respect to said trailer platform on a tilting hinge. Said tilting hinge defines a tilting axis of said tilting trailer assembly. Said body prop is configured to selectively hold a portion of said tilting portions at an incline. Lower guides are configured to slide through portions of said two sidetracks in order to adjust a lower portion of said body prop assembly. Said body prop comprises an upper portion, a side portions and said lower guides. Said upper portion is substantially parallel with said lower guides. Said side portions are substantially perpendicular to said lower guides. Said side portions are substantially perpendicular to said upper portion. A prop hinge brackets are attached to said upper portion. A vessel hinge brackets are attached to a bottom of said tilting portions. Said vessel hinge brackets and said prop hinge brackets comprise one or more hinge eyes to receive a portion of a fastener assemblies. Said fastener assemblies comprise an upper axis of said body prop assembly. Said body prop assembly and said tilting portions rotate relative to one another on said upper axis. Said two sidetracks are attached to side portions of said trailer platform. Said two sidetracks comprise a first sidetrack and a second sidetrack. Said two sidetracks comprise a separation width between said first sidetrack and said second sidetrack. Said lower guides comprises a width. Said width is wider than said separation width. Portions of said lower guides are configured to become trapped within portions of said two sidetracks. Said two sidetracks each comprise an L-bracket and a track assembly. Said L-bracket comprise an L shaped bracket configured for attaching to said side portions of said trailer platform. Said two sidetracks comprise a guide tracks. Said guide tracks are configured to guide portions of said lower guides to adjust said body prop assembly between a raised configuration and a closed configuration. Said track assembly comprise an upper level and a lower level. Said upper level and said lower level are substantially parallel planes with provisions for moving said lower guides freely above said upper level and selectively at said lower level. Portions of said track assembly are welded to said L-bracket. Said guide tracks are constructed of said upper level, said lower level, a second flap, a first flap. Said guide tracks defines a space above said lower level which allows said lower guides to move relatively freely, a gap for allowing said lower guides to pass freely below said lower level and into a lower mid portion, and a trap for holding a portion of said lower guides. Said lower guides are configured to enter said lower level through said gap between a rear upper portion and an upper mid portion, slide down a rear ramp, slide between said upper mid portion and said lower mid portion. Slide into said trap. Portions of said track assembly are configured to allow one-way movement of said lower guides into and out of said trap. Said lower guides are configured to slide into said first flap, lift a portion of said first flap, slide into said trap, closing said first flap behind said lower guides so as to selectively hold a portion of said lower guides in said trap, and said lower guides selectively remains in said trap provided downward force is exerted on said body prop assembly. Said body prop assembly is configured to act as a prop for said tilting portions. Removing a portion of said lower guides from said trap comprises reversing said lower guides into a portion of said first flap, sliding up said first flap, opening said second flap, and sliding said lower guides out of said lower level and onto or above said upper level. Said first flap is configured to selectively pivot on a first hinge. Said second flap is configured to selectively pivot on a second hinge. Said body prop assembly is configured to lift said lower guides entirely off of said two sidetracks with said tilting portions raised sufficiently above said lower guides. With said lower guides lifted off of said two sidetracks, a body width is configured to press into said bottom of said tilting portions and thereby prevent rotation of said body prop.

A body prop assembly for supporting portions of a tilting trailer assembly. Said body prop assembly comprising a body prop, a hinge assembly, two sidetracks. Said body prop assembly configured to attach to said tilting trailer assembly between tilting portions and a trailer platform. Said tilting portions selectively rotate with respect to said trailer platform on a tilting hinge. Said tilting hinge defines a tilting axis of said tilting trailer assembly. Said body prop is configured to selectively hold a portion of said tilting portions at an incline. Lower guides are configured to slide through portions of said two sidetracks in order to adjust a lower portion of said body prop assembly. Said body prop comprises an upper portion, a side portions and said lower guides. A prop hinge brackets are attached to said upper portion. A vessel hinge brackets are attached to a bottom of said tilting portions. Said body prop assembly and said tilting portions rotate relative to one another on an upper axis. Said two sidetracks are attached to side portions of said trailer platform. Said two sidetracks comprise a first sidetrack and a second sidetrack. Said two sidetracks comprise a guide tracks. Said guide tracks are configured to guide portions of said lower guides to adjust said body prop assembly between a raised configuration and a closed configuration.

BRIEF DESCRIPTION OF THE SEVERAL VIEWS OF THE DRAWING

FIG. 4A illustrates an elevated first side view of raised and locked position 400a.

FIG. 6B illustrates an elevated front side view of first geometry diagram 600a.

FIG. 11A illustrates an elevated top side view of second sidetrack 306b.

FIG. 11B illustrates an elevated first side view of second sidetrack 306b.

FIG. 11C illustrates an elevated front side view of second sidetrack 306b.

FIG. 12 illustrates a perspective overview view of first sidetrack 306a.

FIG. 13A illustrates an elevated top side view of first sidetrack 306a.

FIG. 13B illustrates an elevated first side view of first sidetrack 306a.

FIG. 13C illustrates an elevated front side view of first sidetrack 306a.

FIG. 17A illustrates an elevated front side view of tilting truck 1700 in raised configuration 1702a.

FIG. 18 illustrates an elevated front side view of raised configuration 1702a.

DETAILED DESCRIPTION OF THE INVENTION

Figure 1:
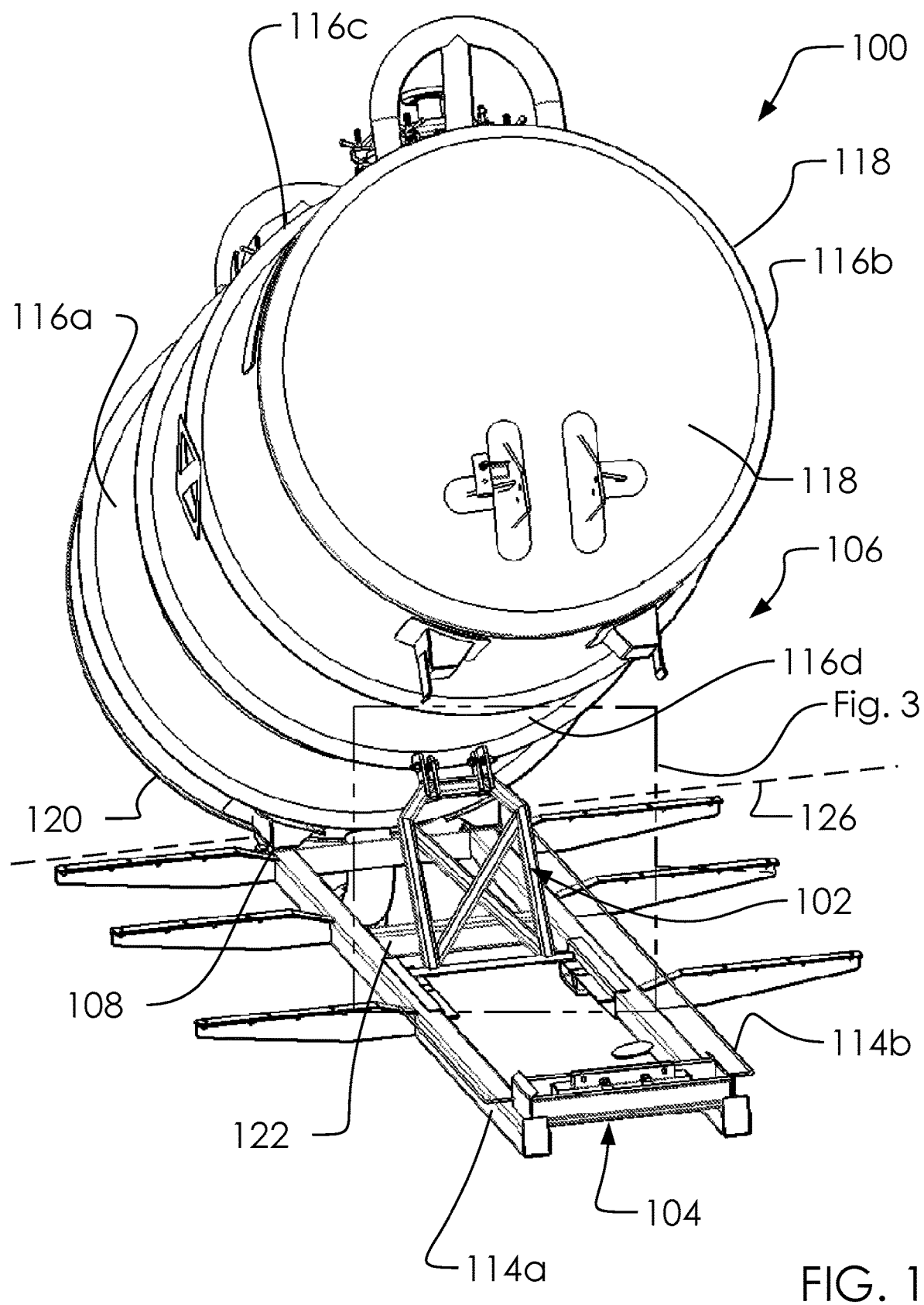
FIG. 1 illustrates a perspective overview view of tilting trailer assembly 100.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

These parts are illustrated in the figures and discussed below:

a tilting trailer assembly 100
a body prop assembly 102
a trailer platform 104
tilting portions 106
a tilting hinge 108
a door hinge 110
one or more latches 112
a side portions 114
a first side portion 114a
a second side portion 114b
a first side 116a
a second side 116b
a top 116c
a bottom 116d
a front portion 118
a rear portion 120
a plurality of perpendicular support portions 122
a vessel 124
a tilting axis 126
a body prop 300
two sidetracks 306
a first sidetrack 306a
a second sidetrack 306b
lower guides 310
a first lower guide 310a
a second lower guide 310b
a hinge assembly 312
a vessel hinge brackets 314
a first vessel hinge bracket 314a
a second vessel hinge bracket 314b
a prop hinge brackets 316
a first prop hinge bracket 316a
a second prop hinge bracket 316b
a fastener assemblies 318
a first fastener assembly 318a
a second fastener assembly 318b
an upper axis 320
an upper portion 322
a side portions 324
a first side portion 324a
a second side portion 324b
a central support portions 326
a separation width 328
a titling positions 400
a raised and locked position 400a
a transitioning position 400b
a closed position 400c
a guide tracks 500
a first guide track 500a
a second guide track 500b
one or more geometry diagrams 600
a first geometry diagram 600a
a second geometry diagram 600b
a third geometry diagram 600c
a first leg 602
a second leg 604 a triangle legs 606
a first lower leg 606*a*
a second lower leg 606*b*
a third lower leg 606*c*
a tilting hinge angles 608
a first tilting hinge angle 608*a*
a second tilting hinge angle 608*b*
a third tilting hinge angle 608*c*
a top hinge angles 610
a first top hinge angle 610*a*
a second top hinge angle 610*b*
a third top hinge angle 610*c*
one or more hinge eyes 702
a first hinge eye 702*a*
a second hinge eye 702*b*
one or more tracks 704
a first track 704*a*
a second track 704*b*
one or more shoulders 706
a first shoulder 706*a*
a second shoulder 706*b*
a body width 802
a height 804
a top width 806
a height 810
a height 812
a width 814
a depth 816
a diameter 818
a depth 820
a diameter 822
a rotating radius 824
an alternative body prop 900
one or more lower shoulders 902
a first lower shoulder 902*a*
a second lower shoulder 902*b*
one or more upper shoulders 904
a first upper shoulder 904*a*
a second upper shoulder 904*b*
an L-bracket 1000
a track assembly 1002
a top portion 1004*a*
a side portion 1004*b*
an upper level 1006
a lower level 1008
a front upper portion 1010
a rear upper portion 1012
a rear ramp 1014
a trap 1016
a lower mid portion 1018
a first hinge 1020
a second hinge 1022
a first flap 1024
a second flap 1026
a weld points 1028
a first weld point 1028*a*
a second weld point 1028*b*
a third weld point 1028*c*
an upper mid portion 1030
a length 1102
a width 1104
a width 1106
a width 1108
a height 1110
a height 1112
a gap 1114
a length 1116
a length 1118
a length 1120
a hinge socket 1400
a planar surface 1402
a hinge socket 1500
a planar surface 1502
a hinge socket 1600
a planar surface 1602
a beveled edge 1604
a tilting truck 1700
a raised configuration 1702*a*
a closed configuration 1702*b*
a stopper portion 1800
a first moving configuration 1900
a fully extended configuration 2000
a dropping configuration 2100
a passing first gate configuration 2200
a trapped configuration 2300
a trap releasing configuration 2400
a resetting configuration 2500

FIG. 1 illustrates a perspective overview view of tilting trailer assembly 100.

In one embodiment, said tilting trailer assembly 100 can comprise said body prop assembly 102, said trailer platform 104, said tilting portions 106, said tilting hinge 108 and said tilting axis 126.

In one embodiment, said trailer platform 104 can comprise said side portions 114, said first side portion 114*a*, said second side portion 114*b* and said plurality of perpendicular support portions 122.

In one embodiment, said tilting portions 106 can comprise said vessel 124.

In one embodiment, said side portions 114 can comprise said first side portion 114*a* and said second side portion 114*b*.

In one embodiment, said vessel 124 can comprise said tilting hinge 108, said door hinge 110, said one or more latches 112, said side portions 114, said first side 116*a*, said second side 116*b*, said top 116*c*, said bottom 116*d*, said front portion 118 and said rear portion 120.

Said tilting trailer assembly 100 can comprise a trailer portion of a vacuum truck, as is known in the art. As stated in the background section, said tilting trailer assembly 100 can be applicable to other tilting trucks such as dump trucks, tip trucks or the like.

Said tilting portions 106 can comprise a vessel 124 being substantially sealed from the outer atmosphere, as is known in the art. In another embodiment, said tilting portions 106 can comprise an open-box bead as in the case of a dump truck (not illustrated).

In one embodiment, said rear portion 120 can comprise a door being selectively sealed to said tilting portions 106 with said one or more latches 112. Said rear portion 120 can comprise a tailgate in the case of a dump truck. In one embodiment, said rear portion 120 can selectively rotate on said door hinge 110.

In one embodiment, said tilting portions 106 can selectively rotate with respect to said trailer platform 104 on said tilting hinge 108.

Said trailer platform 104 can comprise a platform for attaching said tilting trailer assembly 100 to a truck and/or sub frame comprising wheels and mobility parts, as is known in the art.

In one embodiment, said side portions 114 can be substantially parallel with one another with said plurality of perpendicular support portions 122 creating a frame support structure for said tilting hinge 108, said tilting portions 106 and said body prop assembly 102, as illustrated.

In one embodiment, said trailer platform 104 and said tilting portions 106 rotate relative to one another on said tilting axis 126 defined by said tilting hinge 108.

Figure 2A:
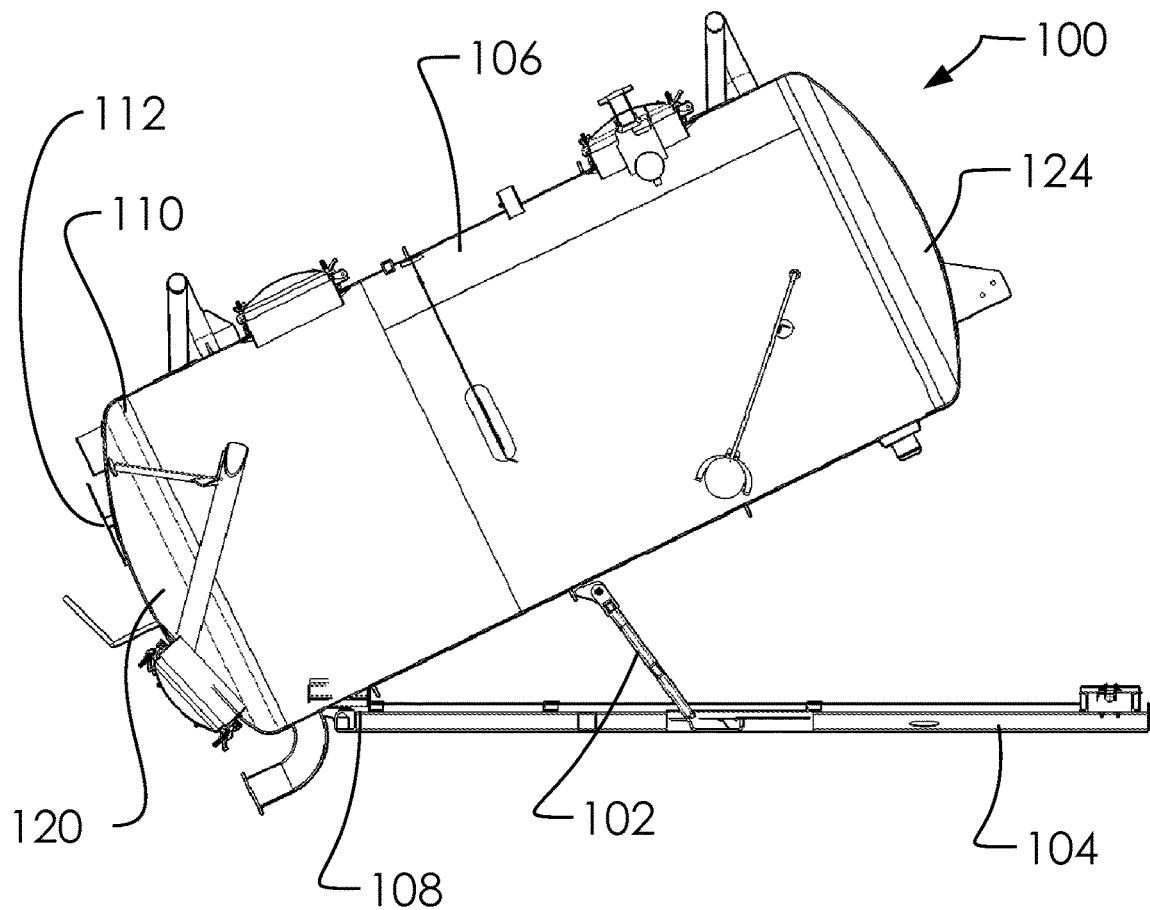
FIG. 2A illustrates an elevated first side view of tilting trailer assembly 100.

FIG. 2A illustrates an elevated first side view of tilting trailer assembly 100.

Figure 2B:
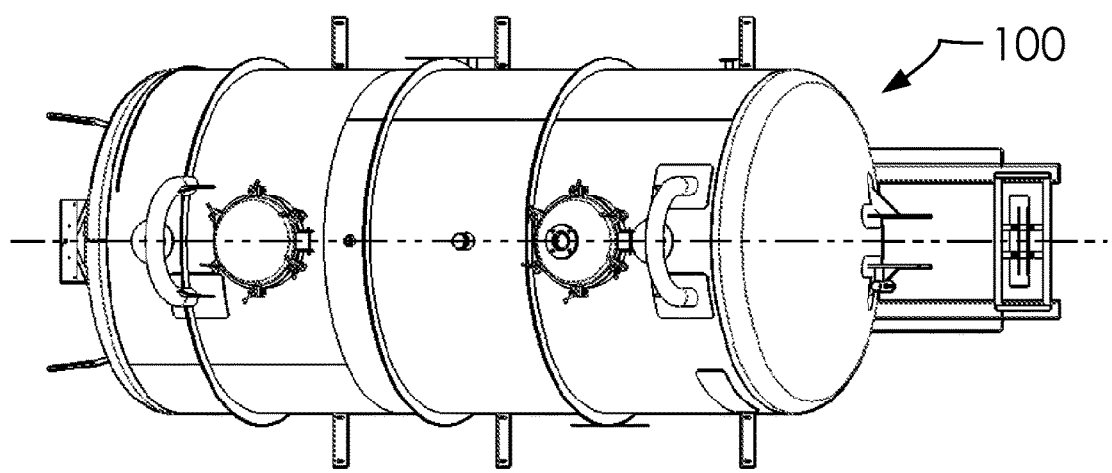
FIG. 2B illustrates an elevated top side view of tilting trailer assembly 100.

FIG. 2B illustrates an elevated top side view of tilting trailer assembly 100.

Figure 3:
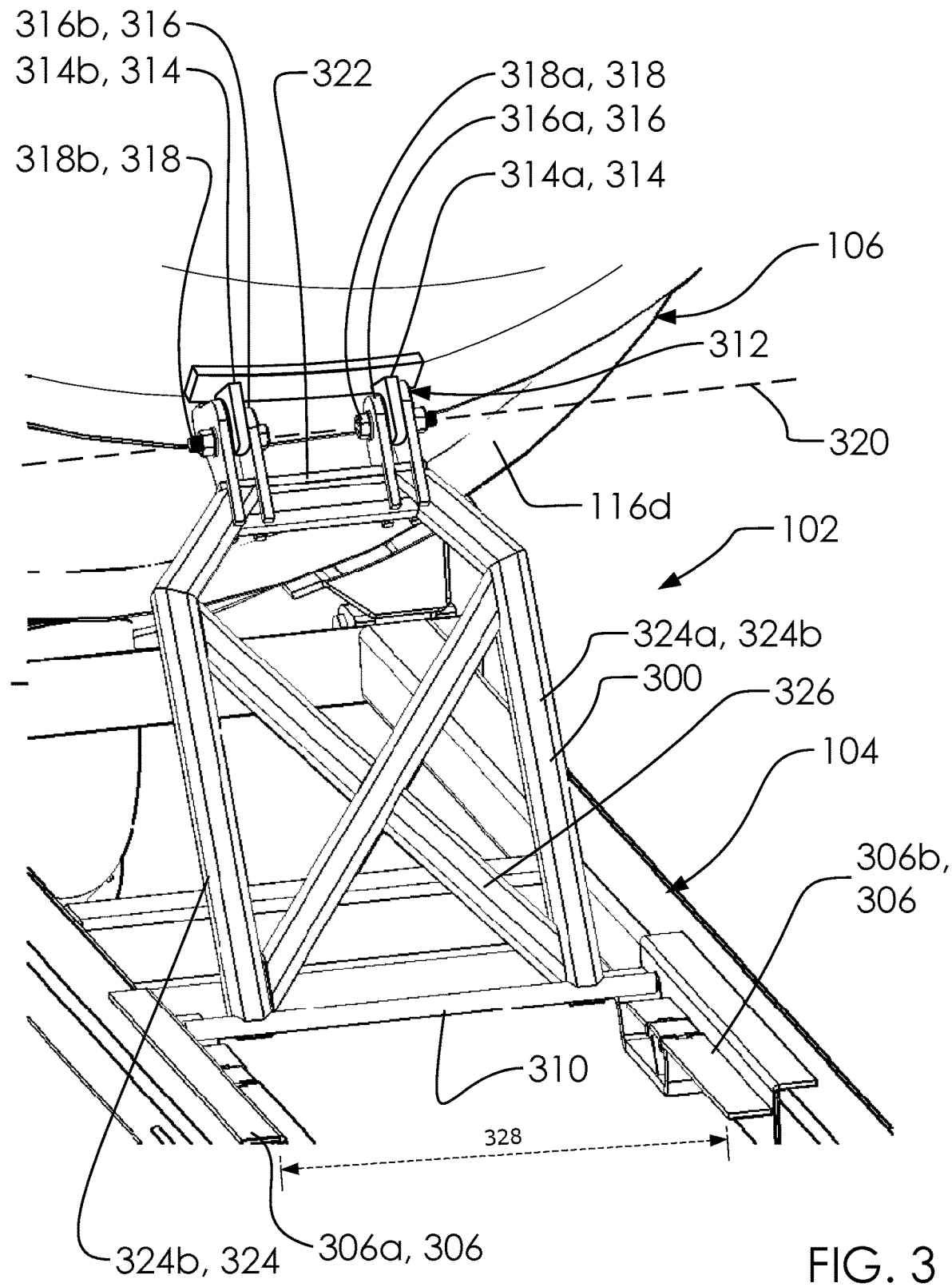
FIG. 3 illustrates a perspective overview view of body prop assembly 102.

FIG. 3 illustrates a perspective overview view of body prop assembly 102.

In one embodiment, said body prop 300 can comprise said lower guides 310, said hinge assembly 312, said upper portion 322, said side portions 324 and said central support portions 326.

In one embodiment, said two sidetracks 306 can comprise said first sidetrack 306a, said second sidetrack 306b and said separation width 328.

In one embodiment, said lower guides 310 can comprise said first lower guide 310a and said second lower guide 310b.

In one embodiment, said hinge assembly 312 can comprise said vessel hinge brackets 314, said second vessel hinge bracket 314b, said prop hinge brackets 316, said second prop hinge bracket 316b, said fastener assemblies 318 and said upper axis 320.

In one embodiment, said vessel hinge brackets 314 can comprise said first vessel hinge bracket 314a and said second vessel hinge bracket 314b.

In one embodiment, said prop hinge brackets 316 can comprise said first prop hinge bracket 316a and said second prop hinge bracket 316b.

In one embodiment, said fastener assemblies 318 can comprise said first fastener assembly 318a and said second fastener assembly 318b.

In one embodiment, said side portions 324 can comprise said first side portion 324a and said second side portion 324b.

In one embodiment, said tilting trailer assembly 100 can comprise said second lower guide 310b and said second lower guide 310b.

In one embodiment, said body prop assembly 102 can comprise said body prop 300 and said two sidetracks 306.

In one embodiment, said body prop assembly 102 can selectively configure said trailer platform 104 relative to said tilting portions 106. Said body prop 300 can hold a portion of said tilting portions 106 at an incline, as illustrated.

In one embodiment, said lower guides 310 is configured to slide through portions of two sidetracks 306 in order to adjust a lower portion of body prop assembly 102. In one embodiment, said upper portion 322 can be rotateably attached to tilting portions 106 with said hinge assembly 312.

In one embodiment, said hinge assembly 312 can comprise vessel hinge brackets 314, said prop hinge brackets 316 and said fastener assemblies 318. In one embodiment, said fastener assemblies 318 can attach said prop hinge brackets 316 and said vessel hinge brackets 314 to one another. In one embodiment, said fastener assemblies 318 can define said upper axis 320. In one embodiment, said upper axis 320 can comprise an axis of rotation between said tilting portions 106 and said body prop assembly 102.

In one embodiment, said body prop 300 can comprise a solid piece (as with the provisional application to this application) or as a set of framed elements as illustrated here. In one embodiment, said body prop 300 can comprise upper portion 322 at a top portion. Said upper portion 322 can be substantially parallel with said lower guides 310. Said side portions 324 can be substantially perpendicular to said lower guides 310, as well as perpendicular to said upper portion 322. In one embodiment, said central support portions 326 can reinforce and fill a portion of a space between said side portions 324, said lower guides 310 and said upper portion 322.

In one embodiment, said prop hinge brackets 316 are attached to said upper portion 322. In one embodiment, said vessel hinge brackets 314 are attached to bottom 116d of said tilting portions 106. In one embodiment, said vessel hinge brackets 314 and said prop hinge brackets 316 comprise apertures to receive a portion of fastener assemblies 318.

Figure 4A:
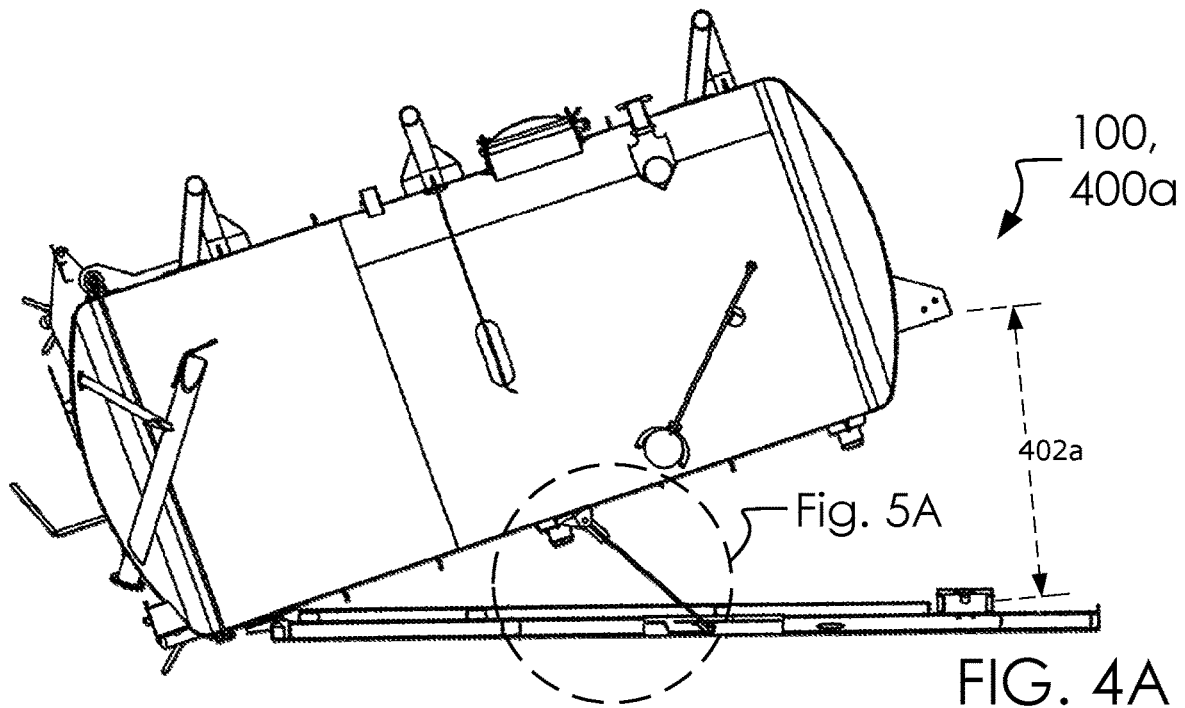

FIG. 4A illustrates an elevated first side view of raised and locked position 400a.

Figure 4B:
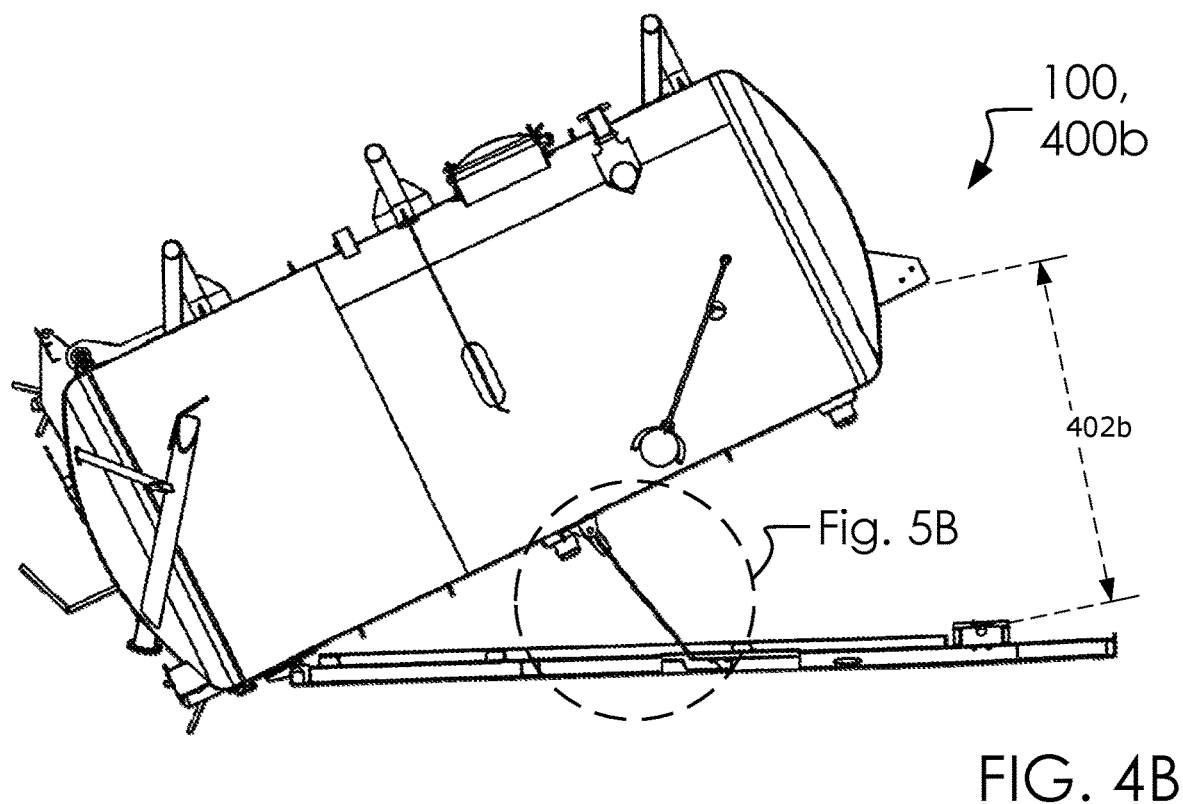
FIG. 4B illustrates an elevated first side view of transitioning position 400b.

FIG. 4B illustrates an elevated first side vie of transitioning position 400b.

In one embodiment, said titling positions 400 can comprise said raised and locked position 400a, said transitioning position 400b and said closed position 400c.

In one embodiment, said tilting trailer assembly 100 can comprise said titling positions 400.

In one embodiment, said two sidetracks 306 can comprise said closed position 400c.

Said tilting trailer assembly 100 can comprise said titling positions 400, as well as many more, as said body prop assembly 102 is moved between settings.

Said raised and locked position 400a can comprise said tilting trailer assembly 100 in an upright and locked configuration with said lower guides 310 engaged into a portion of said two sidetracks 306 to hold said tilting portions 106 upright. Said transitioning position 400b can comprise said lower guides 310 sliding through a portion of said two sidetracks 306 so as to transition toward a lowered position (said closed position 400c, illustrated below).

Figure 5A:
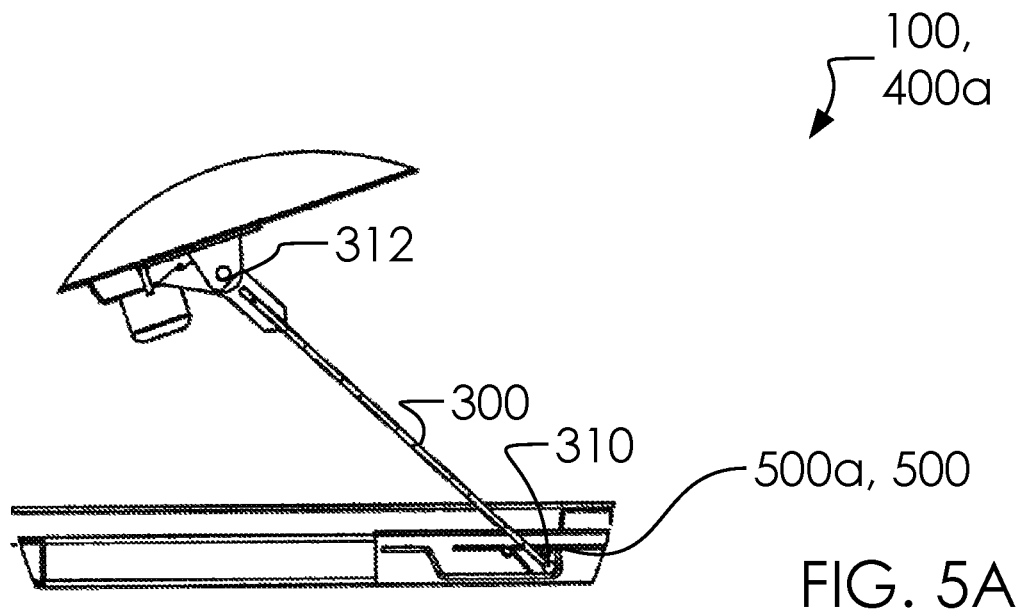
FIG. 5A illustrates an elevated first side view of raised and locked position 400a detailed.

FIG. 5A illustrates an elevated first side view of raised and locked position 400a detailed.

Figure 5B:
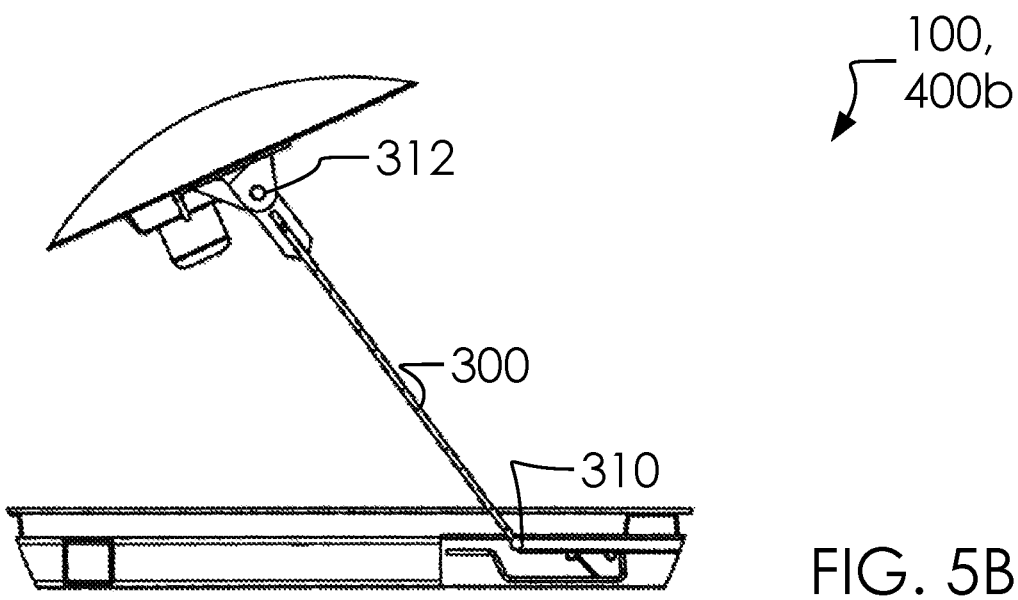
FIG. 5B illustrates an elevated first side view of transitioning position 400b detailed.

FIG. 5B illustrates an elevated first side view of transitioning position 400b detailed.

Figure 5C:
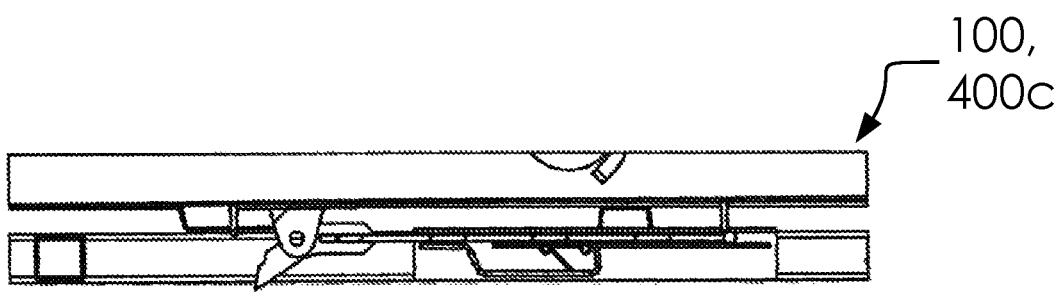
FIG. 5C illustrates an elevated first side view of closed position 400c detailed.

FIG. 5C illustrates an elevated first side view of closed position 400c detailed.

In one embodiment, said guide tracks 500 can comprise said first guide track 500a and said second guide track 500b.

In one embodiment, said two sidetracks 306 can comprise said guide tracks 500.

Note that the cross section views here are of a previous version of body prop 300, but the interaction of said lower guides 310 and guide tracks 500 are consistent with the present, preferred embodiment.

Said body prop 300 can be configured to move between said tilting portions 106 and said trailer platform 104; wherein, said lower guides 310 can move along a horizontal plane between said two sidetracks 306 in said guide tracks 500.

Figure 6A:
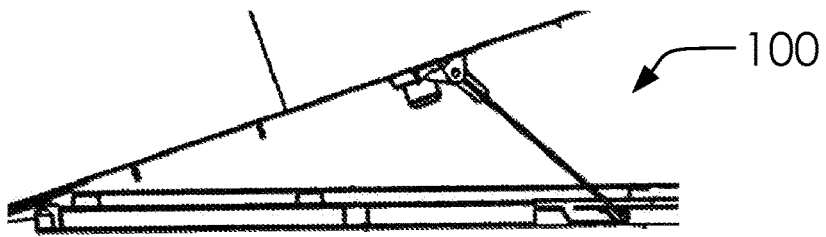
FIG. 6A illustrates a detailed elevated first side view of tilting trailer assembly 100.

FIG. 6A illustrates a detailed elevated first side view of tilting trailer assembly 100.

Figure 6B:
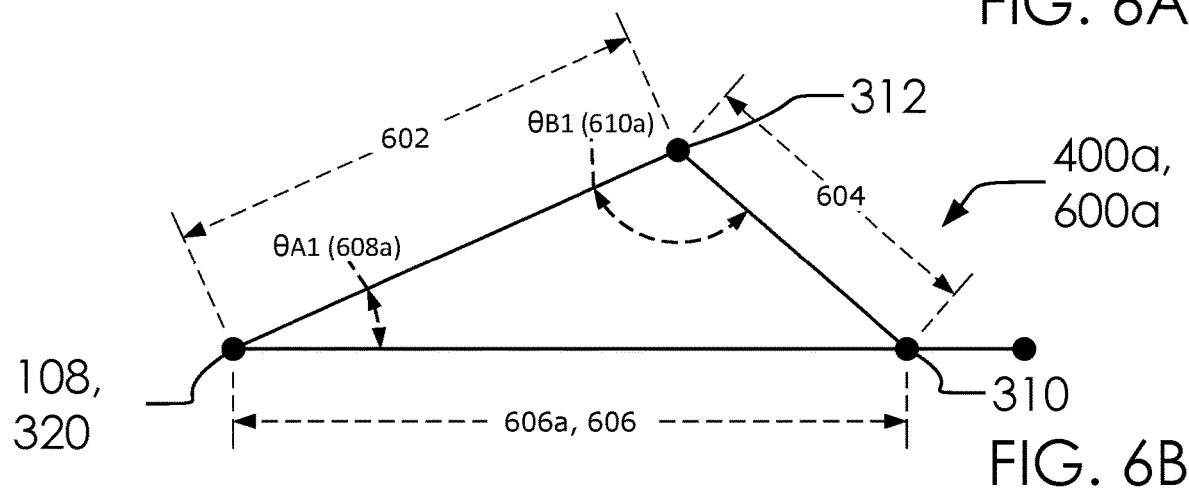

FIG. 6B illustrates an elevated front side view of first geometry diagram 600a.

Figure 6C:
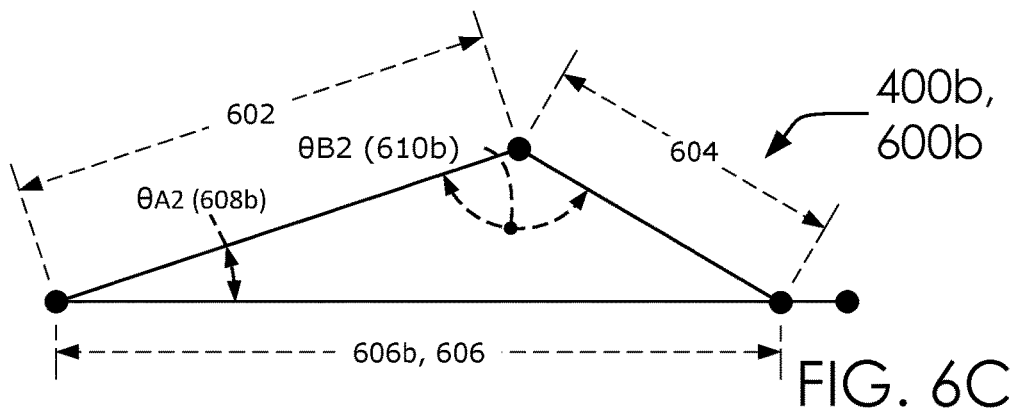
FIG. 6C illustrates an elevated front side view of second geometry diagram 600b.

FIG. 6C illustrates an elevated front side view of second geometry diagram 600b.

Figure 6D:
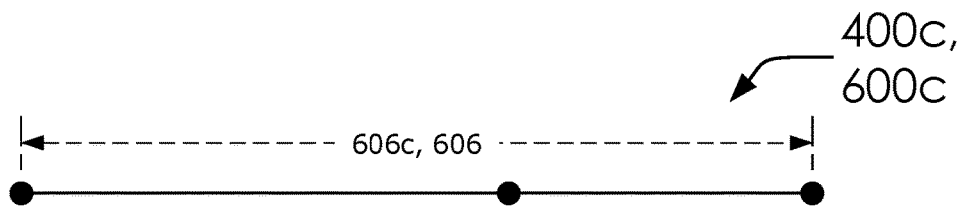
FIG. 6D illustrates an elevated front side view of third geometry diagram 600c.

FIG. 6D illustrates an elevated front side view of third geometry diagram 600c.

In one embodiment, said one or more geometry diagrams 600 can comprise said first geometry diagram 600a, said second geometry diagram 600b, said third geometry diagram 600c, said first leg 602, said second leg 604, said second leg 604 and said triangle legs 606.

In one embodiment, said triangle legs 606 can comprise said first lower leg 606a, said second lower leg 606b and said third lower leg 606c.

In one embodiment, said tilting hinge angles 608 can comprise said first tilting hinge angle 608a, said second tilting hinge angle 608b and said third tilting hinge angle 608c.

In one embodiment, said top hinge angles 610 can comprise said first top hinge angle 610a, said second top hinge angle 610b and said third top hinge angle 610c.

In one embodiment, said hinge assembly 312 can comprise said top hinge angles 610.

Now, said tilting trailer assembly 100 can allow said body prop assembly 102, said trailer platform 104 and said tilting portions 106 to move through said titling positions 400. Said one or more geometry diagrams 600 are provided to illustrate the geometry of that movement.

Said one or more geometry diagrams 600 can comprise a triangle having three legs and three angles. Said first leg 602 and said second leg 604 can remain fixed in length whereas said triangle legs 606 can be variable since said lower guides 310 moves along a horizontal plane, as illustrated.

With said tilting trailer assembly 100 in said raised and locked position 400a, said tilting hinge 108 can be in said 608a, said hinge assembly 312 can be in said first top hinge angle 610a, and said triangle legs 606 can be in said first lower leg 606a. Likewise, said transitioning position 400b can comprise said tilting hinge 108 in said first tilting hinge angle 608a, said hinge assembly 312 can be in said second top hinge angle 610b, and said triangle legs 606 can be in said second lower leg 606b. Finally, with said closed position 400c, said third tilting hinge angle 608c can be zero degrees, said third top hinge angle 610c can comprise 180 degrees, and said third lower leg 606c can comprise the sum of the lengths of said first lower leg 606a and said second lower leg 606b.

Figure 7:
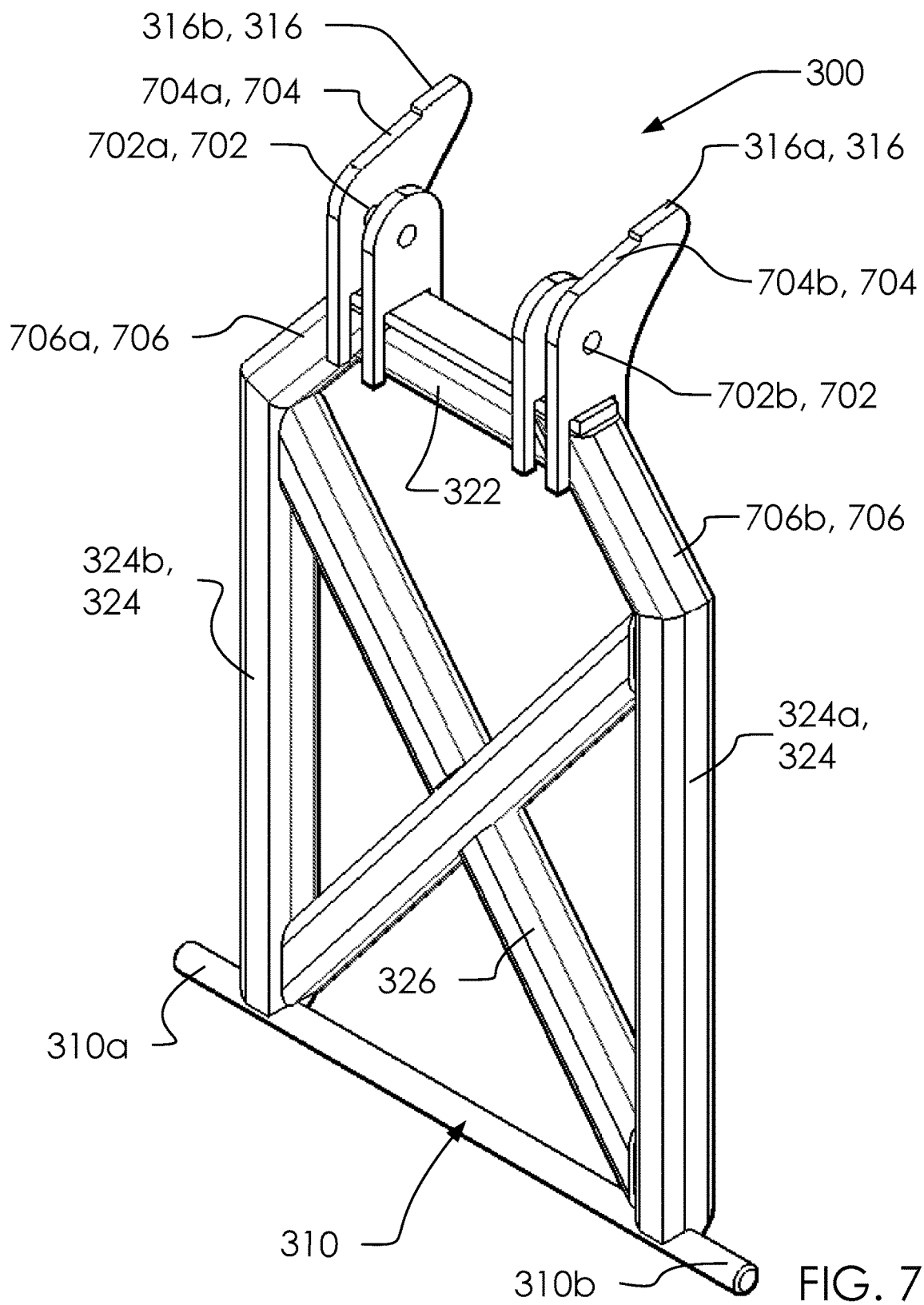
FIG. 7 illustrates a perspective overview view of body prop assembly 102.

FIG. 7 illustrates a perspective overview view of body prop assembly 102.

In one embodiment, said one or more hinge eyes 702 can comprise said first hinge eye 702a and said second hinge eye 702b.

In one embodiment, said one or more tracks 704 can comprise said first track 704a and said second track 704b.

In one embodiment, said one or more shoulders 706 can comprise said first shoulder 706a and said second shoulder 706b.

In one embodiment, said body prop 300 can comprise said second track 704b, said one or more shoulders 706 and said second shoulder 706b.

In one embodiment, said one or more tracks 704 press against a portion of said tilting portions 106 so as to limit the movement of other portions of said body prop assembly 102 such as said lower guides 310. For example, said one or more tracks 704 can cause a portion of said lower guides 310 to slide into said two sidetracks 306, as illustrated and discussed below.

Figure 8A:
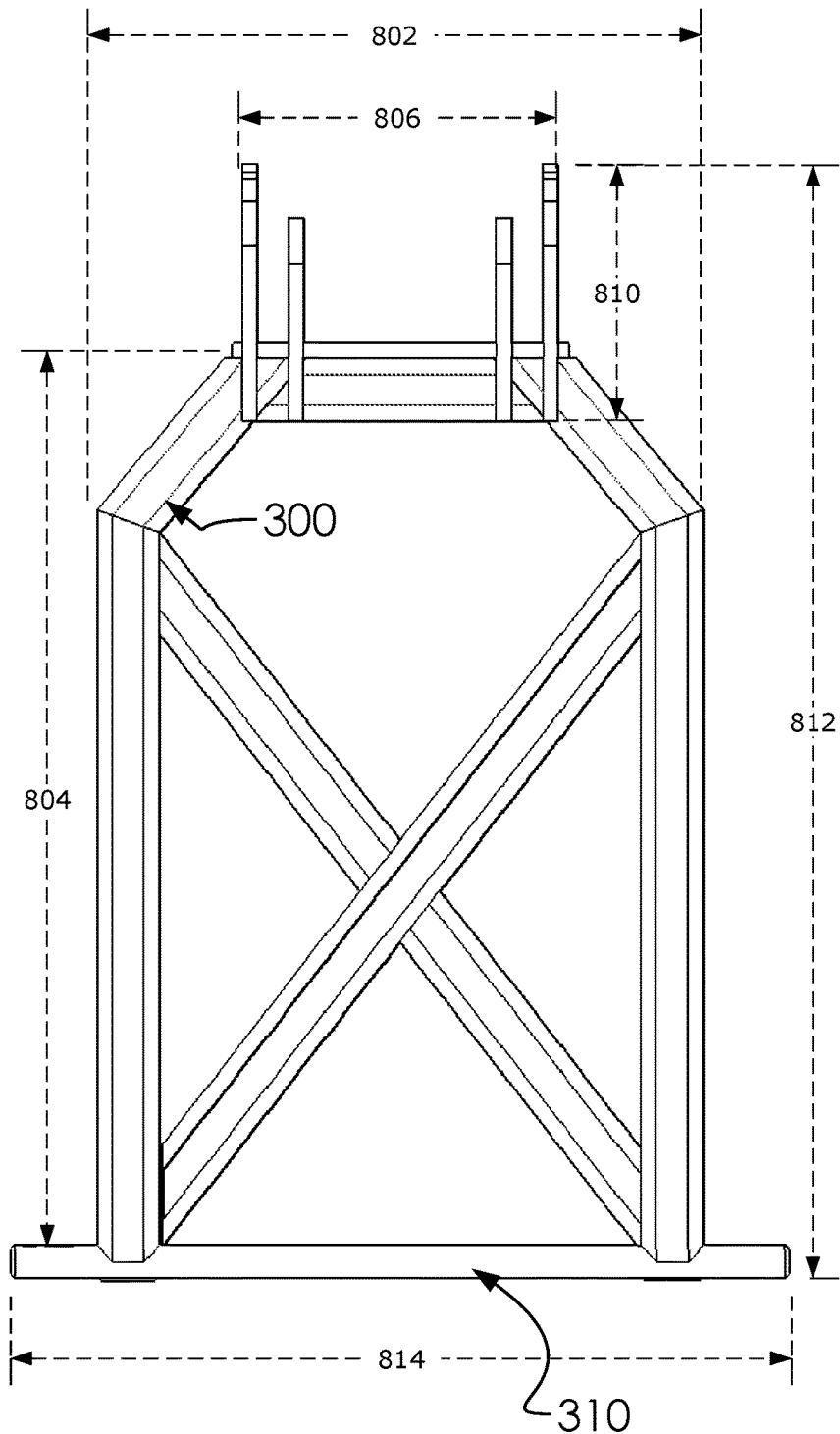
FIG. 8A illustrates an elevated front side view of body prop 300.

FIG. 8A illustrates an elevated front side view of body prop 300.

Figure 8B:
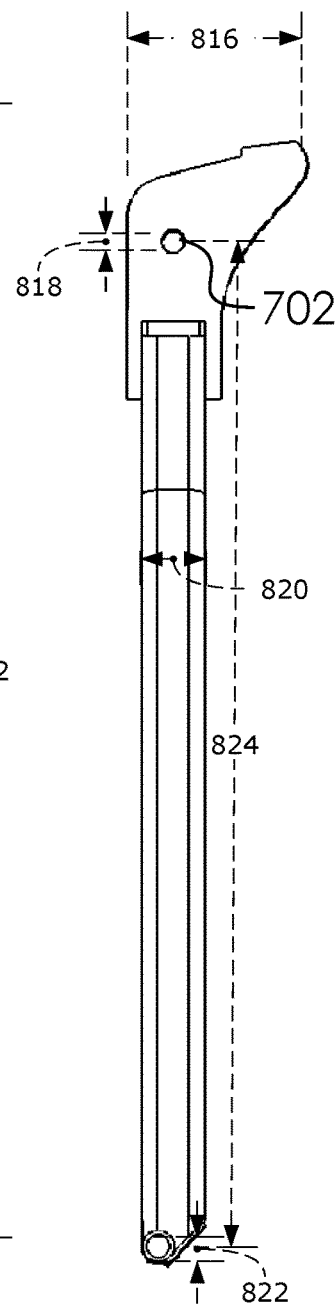
FIG. 8B illustrates an elevated second side view of body prop 300.

FIG. 8B illustrates an elevated second side view of body prop 300.

In one embodiment, said body prop assembly 102 can comprise said height 812, said width 814 and said rotating radius 824.

In one embodiment, said body prop 300 can comprise said body width 802, said height 804, said top width 806 and said depth 820.

In one embodiment, said lower guides 310 can comprise said diameter 822.

In one embodiment, said one or more hinge eyes 702 can comprise said diameter 818.

In one embodiment, said body prop 300 can comprise various geometries, whether to scale with these diagrams or not to scale. However, these dimensions are labeled for discussion elsewhere.

In one embodiment, said body prop 300 can comprise a metal sufficient to hold a portion of the weight of said vessel 124, as is known in the art.

In one embodiment, said prop hinge brackets 316 can each comprise two plates each, as illustrated. Wherein, a portion of said vessel hinge brackets 314 can be situated between said prop hinge brackets 316 for accurate alignment of said upper axis 320 and support of said fastener assemblies 318.

In one embodiment, said lower guides 310 can be configured to slide through portions of said guide tracks 500. For example, separation width 328 of two sidetracks 306 can be less than rotating radius 824 of lower guides 310.

Figure 9A:
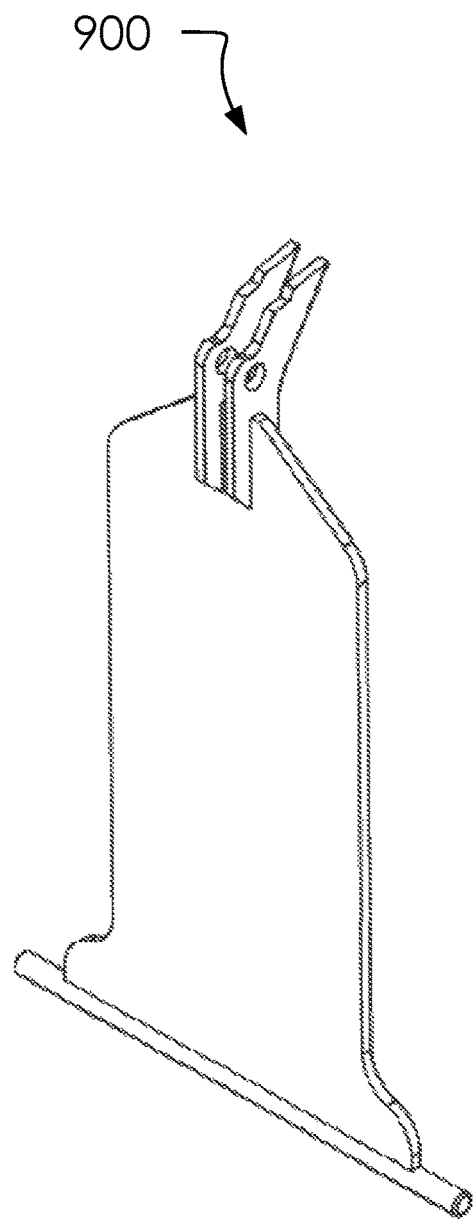
FIG. 9A illustrates a perspective overview view of alternative body prop 900.

FIG. 9A illustrates a perspective overview view of alternative body prop 900.

Figure 9B:
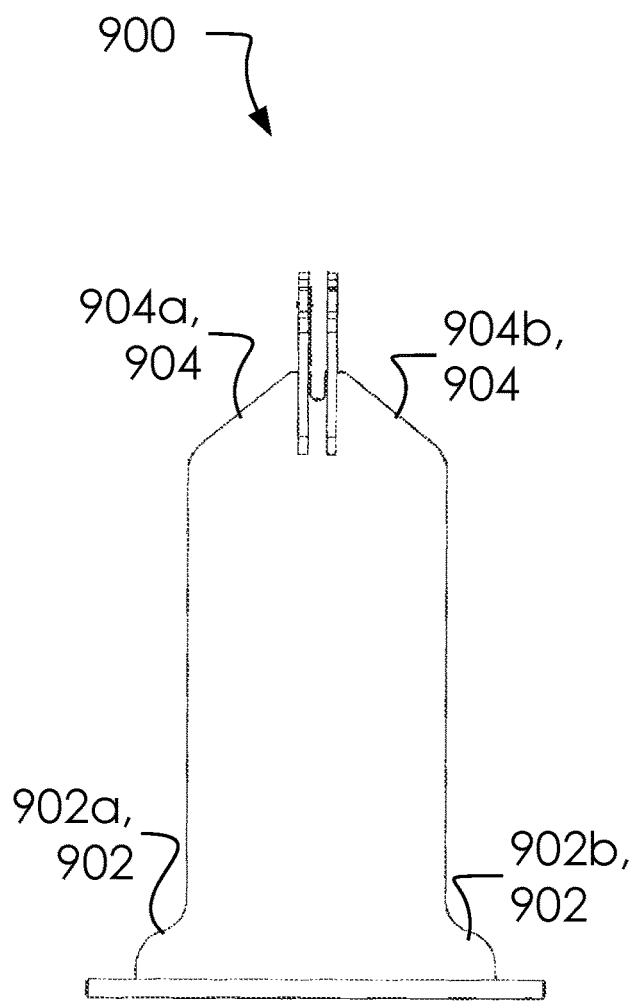
FIG. 9B illustrates an elevated front side view of alternative body prop 900.

FIG. 9B illustrates an elevated front side view of alternative body prop 900.

In one embodiment, said alternative body prop 900 can comprise said alternative body prop 900, said one or more lower shoulders 902, said second lower shoulder 902b and said one or more upper shoulders 904.

In one embodiment, said one or more lower shoulders 902 can comprise said first lower shoulder 902a and said second lower shoulder 902b.

In one embodiment, said one or more upper shoulders 904 can comprise said first upper shoulder 904a and said second upper shoulder 904b.

In one embodiment, said body prop assembly 102 can comprise said alternative body prop 900 and said alternative body prop 900.

Said alternative body prop 900 is included as one of the earlier embodiments of said body prop 300.

Figure 10:
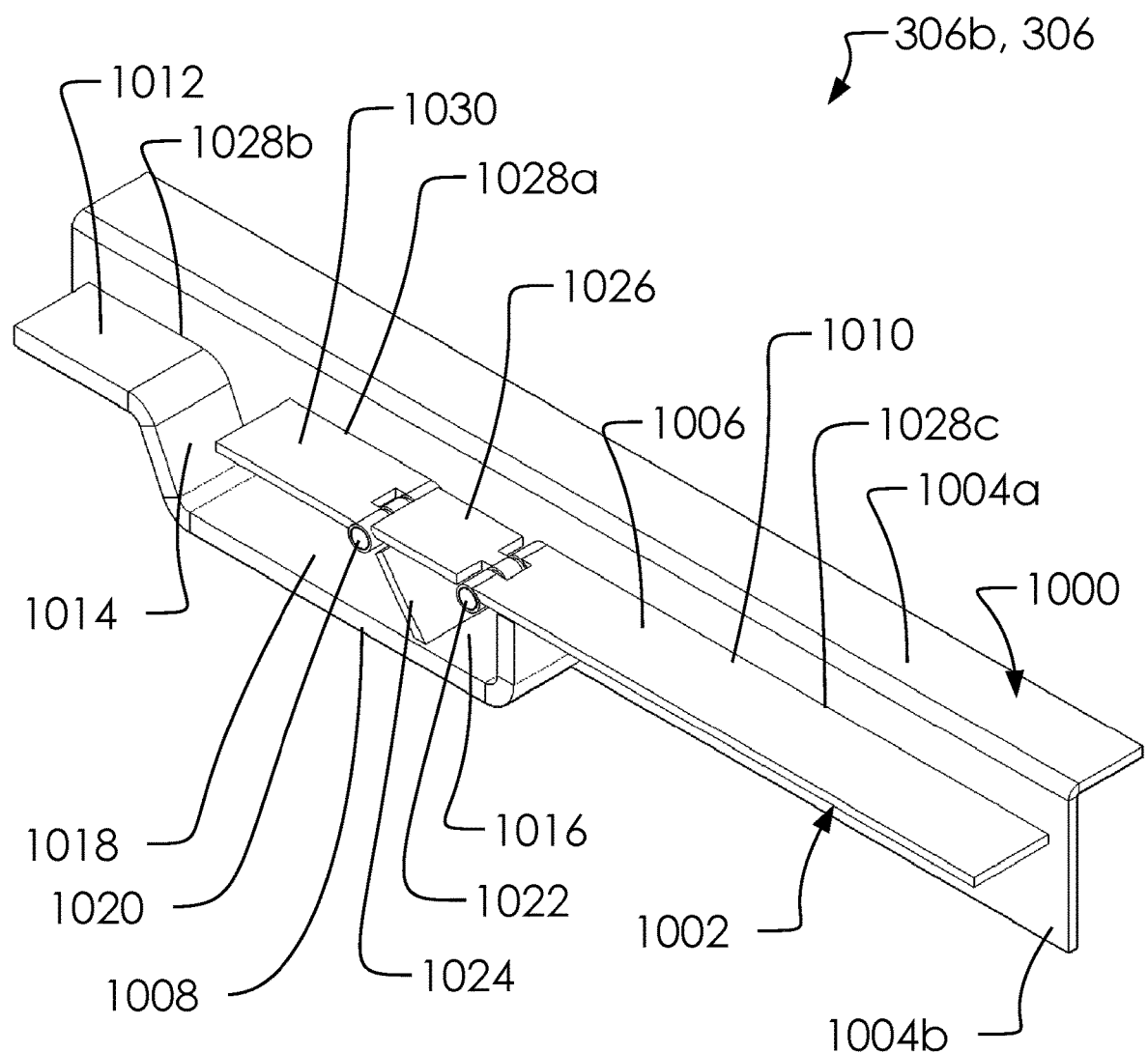
FIG. 10 illustrates a perspective overview view of second sidetrack 306b.

FIG. 10 illustrates a perspective overview view of second sidetrack 306b.

In one embodiment, said weld points 1028 can comprise said first weld point 1028a, said second weld point 1028b and said third weld point 1028c.

In one embodiment, said two sidetracks 306 can comprise said L-bracket 1000, said track assembly 1002, said top portion 1004a, said side portion 1004b, said upper level 1006, said lower level 1008, said front upper portion 1010, said rear upper portion 1012, said rear ramp 1014, said trap 1016, said lower mid portion 1018, said first hinge 1020, said second hinge 1022, said first flap 1024, said second flap 1026, said second flap 1026, said weld points 1028 and said upper mid portion 1030.

In one embodiment, said two sidetracks 306 can each comprise parts as illustrated by said second sidetrack 306b. Wherein, said first sidetrack 306a can comprise a mirror image of said second sidetrack 306b as illustrated.

In one embodiment, said L-bracket 1000 can comprise an L shaped bracket configured for attaching to said side portions 114 of said trailer platform 104.

In one embodiment, said track assembly 1002 can comprise said guide tracks 500 for guiding said lower guides 310 of said body prop assembly 102.

In one embodiment, track assembly 1002 can comprise said upper level 1006 and said lower level 1008; wherein, said upper level 1006 and said lower level 1008 are substantially parallel planes with provisions for moving said lower guides 310 freely above said upper level 1006 and selectively at said lower level 1008.

In one embodiment, portions of said track assembly 1002 are welded to said L-bracket 1000 with said weld points 1028. For example, in one embodiment, said rear upper portion 1012 is welded to said side portion 1004b with said second weld point 1028b; said upper mid portion 1030 with said first weld point 1028a; and said front upper portion 1010 with said third weld point 1028c.

Said lower guides 310 can enter said lower level 1008 through said gap 1114 between said rear upper portion 1012 and said upper mid portion 1030; slide down said rear ramp 1014; slide between said upper mid portion 1030 and said lower mid portion 1018; and slide into said trap 1016.

Portions of said track assembly 1002 can allow one-way movement of said lower guides 310 into and out of said trap 1016. For example, in one embodiment, said lower guides 310 can slide into said first flap 1024, lift a portion of said first flap 1024; slide into said trap 1016; said first flap 1024 can close behind said lower guides 310 so as to selectively hold a portion of said lower guides 310 in said trap 1016; and said lower guides 310 can remain in said trap 1016 provided any downward force is exerted on said body prop assembly 102. In this configuration, said body prop assembly 102 can act as a stand or prop for said tilting portions 106, as illustrated in FIG. 1.

In one embodiment, removing a portion of said lower guides 310 from said trap 1016 can comprise reversing said lower guides 310 into a portion of said first flap 1024, sliding up said first flap 1024, opening said second flap 1026, and sliding out of said lower level 1008 and onto or above said upper level 1006.

Said first flap 1024 can selectively pivot on said first hinge 1020. Said second flap 1026 can selectively pivot on said second hinge 1022.

FIG. 11A illustrates an elevated top side view of second sidetrack 306b.

FIG. 11B illustrates an elevated first side view of second sidetrack 306b.

FIG. 11C illustrates an elevated from side view of second sidetrack 306b.

In one embodiment, said gap 1114 can comprise said length 1120.

In one embodiment, said two sidetracks 306 can comprise said length 1102 and said width 1104.

In one embodiment, said L-bracket 1000 can comprise said width 1106 and said height 1110.

In one embodiment, said trap 1016 can comprise said length 1118.

In one embodiment, said lower mid portion 1018 can comprise said length 1116.

In one embodiment, said track assembly 1002 can comprise said width 1108, said height 1112 and said gap 1114.

In one embodiment, said two sidetracks 306 can be adapted in scale to ensure a preferred range of motion for said body prop 300. For example, said gap 1114 can comprise a gap in upper level 1006 sufficient to allow a portion of lower guides 310 to pass from said upper level 1006 down to said lower level 1008, as discussed above. In one embodiment, said height 1112 and gap 1114 can be large enough to allow said first lower guide 310a and said second lower guide 310b to pass therethrough.

Said trap 1016 can be large enough to allow said lower guides 310 to pass in and said first flap 1024 to close there behind.

Figure 12:
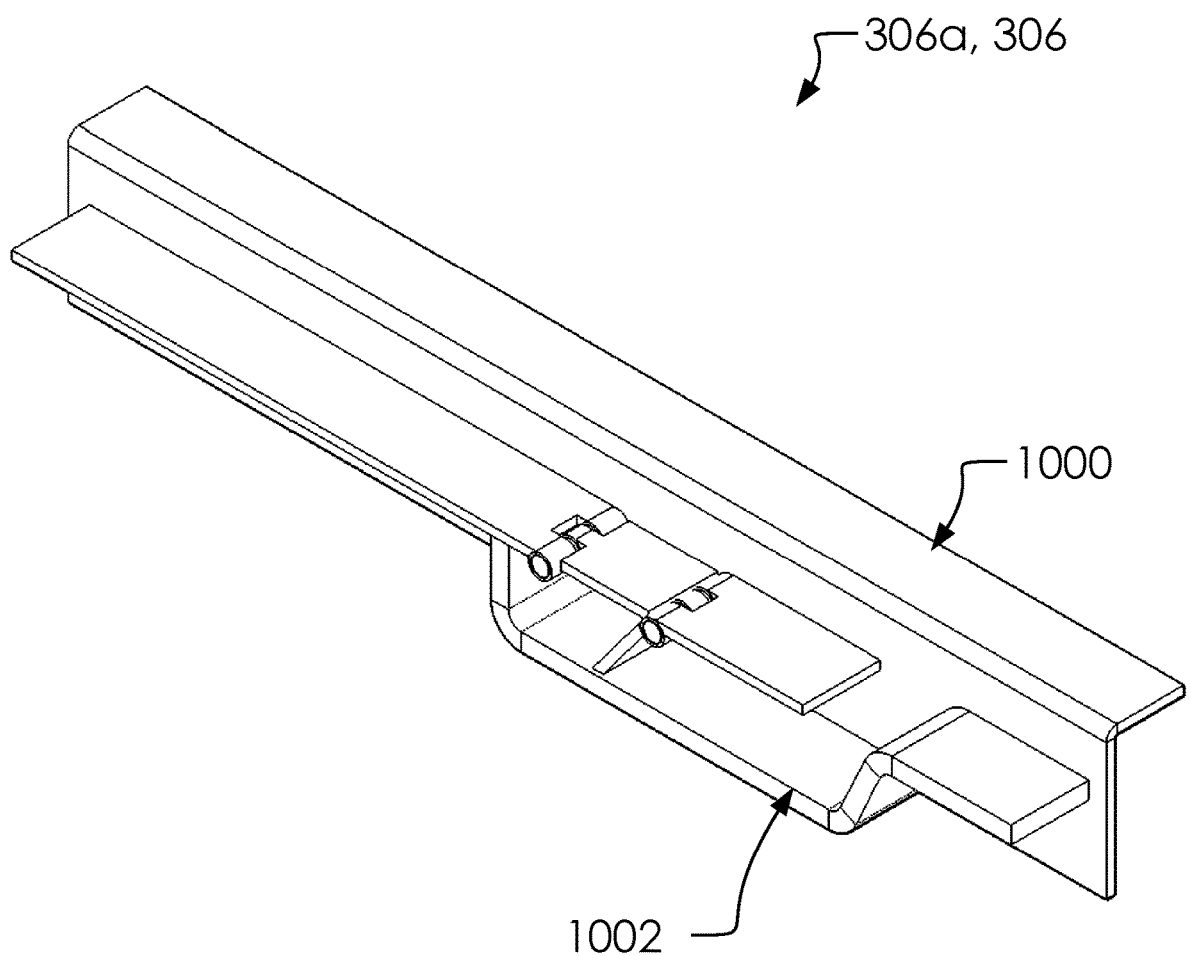

FIG. 12 illustrates a perspective overview view of first sidetrack 306a.

In one embodiment, said first sidetrack 306a can comprise a mirror image of said second sidetrack 306b, and can have a similar or identical arrangement of parts, as is known in the art.

FIG. 13A illustrates an elevated top side view of first sidetrack 306a.

FIG. 13B illustrates an elevated first side view of first sidetrack 306a.

FIG. 13C illustrates an elevated front side view of first sidetrack 306a.

Figure 14A:
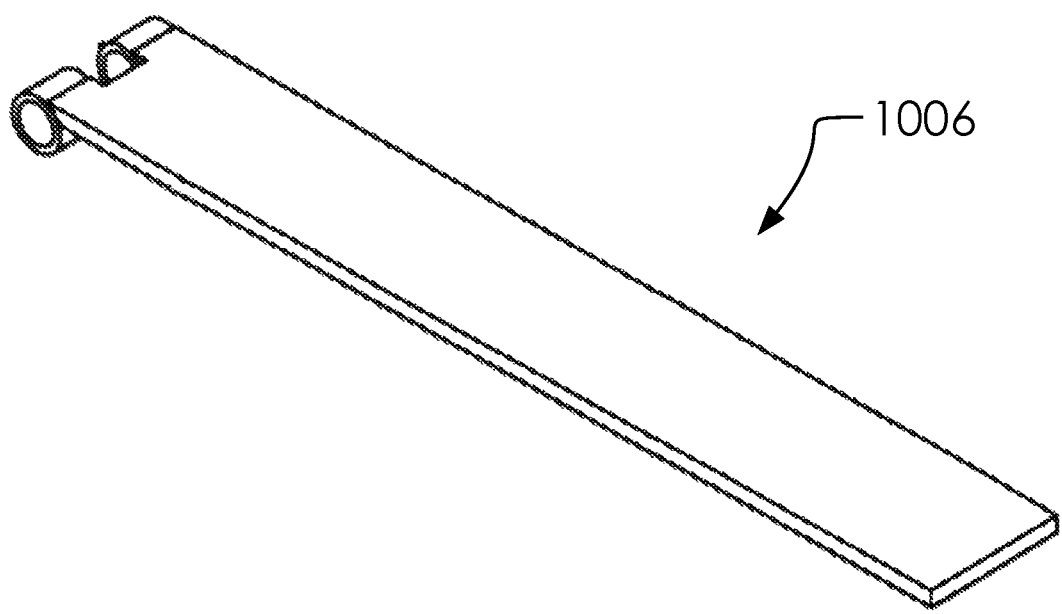
FIG. 14A illustrates a perspective overview view of upper level 1006.

FIG. 14A illustrates a perspective overview view of upper level 1006.

Figure 14B:
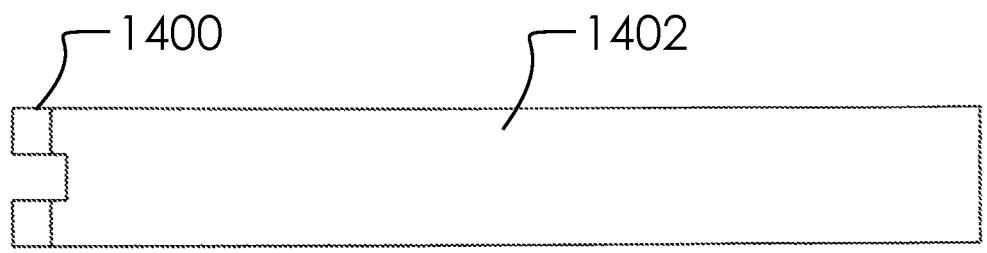
FIG. 14B illustrates an elevated top side view of upper level 1006.

FIG. 14B illustrates an elevated top side view of upper level. 1006.

Figure 14C:
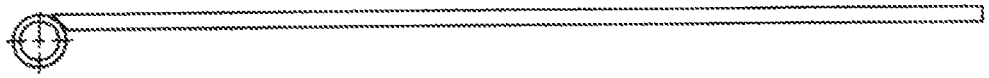
FIG. 14C illustrates an elevated front side view of upper level 1006.

FIG. 14C illustrates an elevated front side view of upper level 1006.

In one embodiment, said upper level 1006 can comprise said hinge socket 1400 and said planar surface 1402.

In one embodiment, said upper level 1006 can be attached to a portion of said L-bracket 1000. In one embodiment, said second hinge 1022 and said second flap 1026 can be attached to said hinge socket 1400.

Figure 15A:
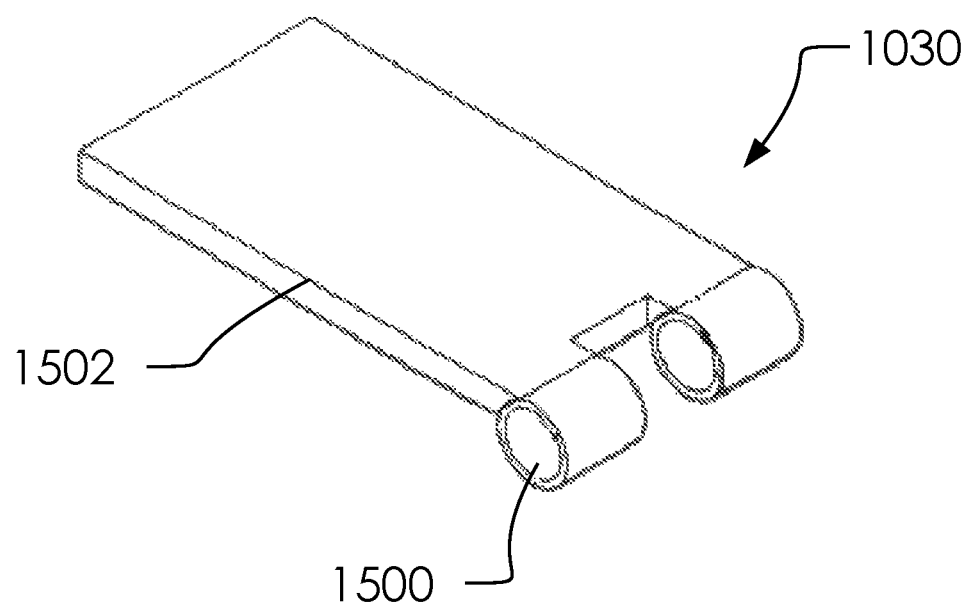
FIG. 15A illustrates a perspective overview view of upper mid portion 1030.

FIG. 15A illustrates a perspective overview view of upper mid portion 1030.

Figure 15B:
FIG. 15B illustrates an elevated top side view of upper mid portion 1030.

FIG. 15B illustrates an elevated top side view of upper mid portion 1030.

Figure 15C:
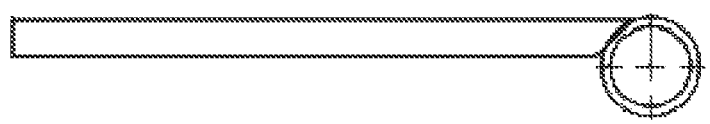
FIG. 15C illustrates an elevated front side view of upper mid portion 1030.

FIG. 15C illustrates an elevated front side view of upper mid portion 1030.

In one embodiment, said upper mid portion 1030 can comprise said hinge socket 1500 and said planar surface 1502.

In one embodiment, said hinge socket 1500 can rotateably attach to said first hinge 1020 and said first flap 1024. In one embodiment, said hinge socket 1500 can also selectively receive and support a portion of said second flap 1026.

In one embodiment, said planar surface 1502 can be welded to a portion of said L-bracket 1000. In one embodiment, said upper mid portion 1030 can remain motionless with respect to said L-bracket 1000.

Figure 16A:
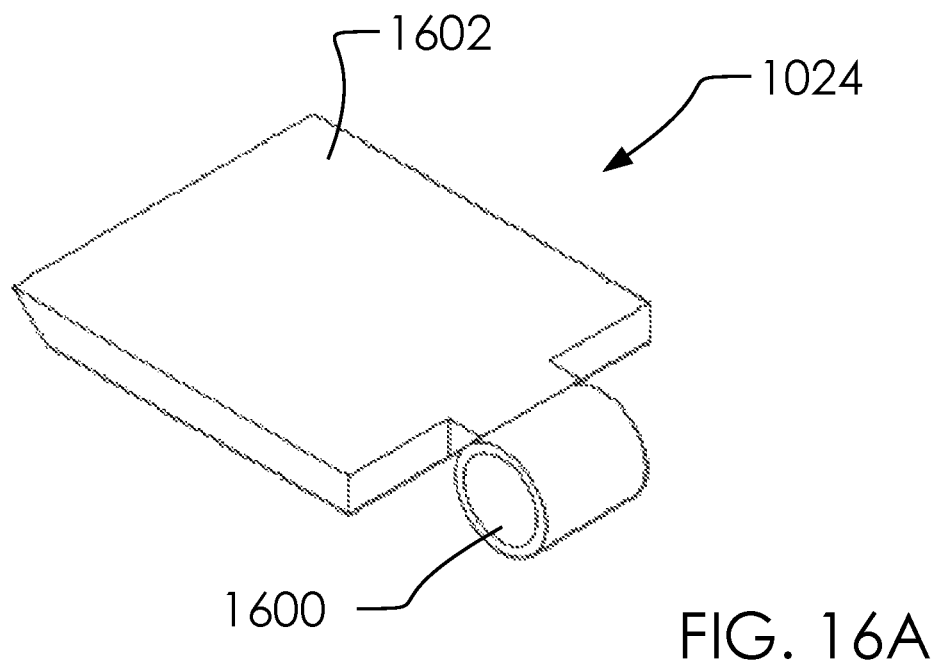
FIG. 16A illustrates a perspective overview view of first flap 1024.

FIG. 16A illustrates a perspective overview view of first flap 1024.

Figure 16B:
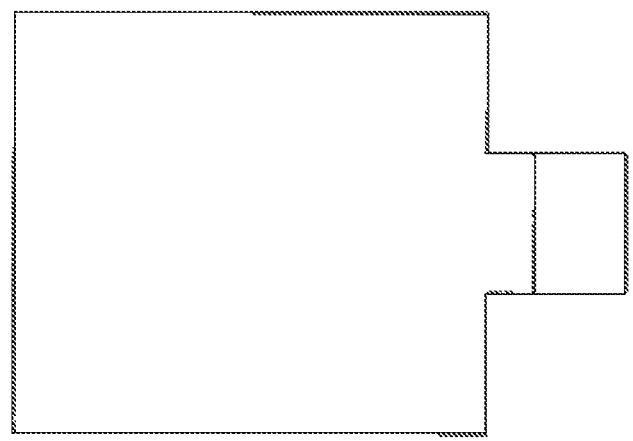
FIG. 16B illustrates an elevated top side view of first flap 1024.

FIG. 16B illustrates an elevated top side view of first flap 1024.

Figure 16C:
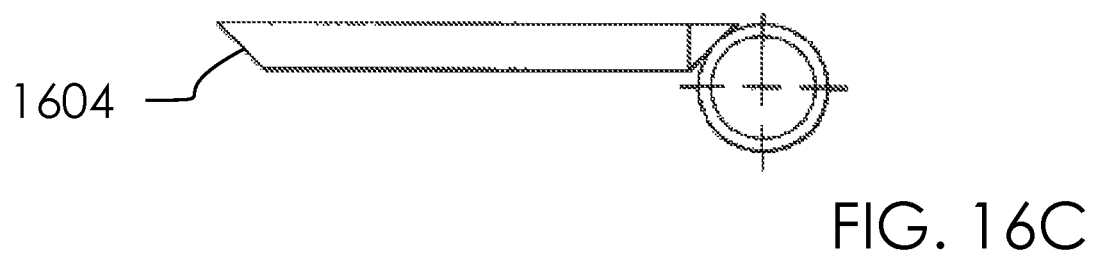
FIG. 16C illustrates an elevated front side view of first flap 1024.

FIG. 16C illustrates an elevated front side view of first flap 1024.

In one embodiment, said first flap 1024 can comprise said hinge socket 1600, said planar surface 1602 and said beveled edge 1604.

In one embodiment, said hinge socket 1600 can rotateably attach to said first hinge 1020. In one embodiment, said beveled edge 1604 can be angled so as to enable said first flap 1024 to rest flat on said lower level 1008, as illustrated.

In one embodiment, said second flap 1026 and said first flap 1024 can be of a similar design. However, said hinge socket 1600 for said second flap 1026 can be configured to rotateably attach to said second hinge 1022, and said beveled edge 1604 can be configured to rest evenly on said first hinge 1020.

Figure 17A:
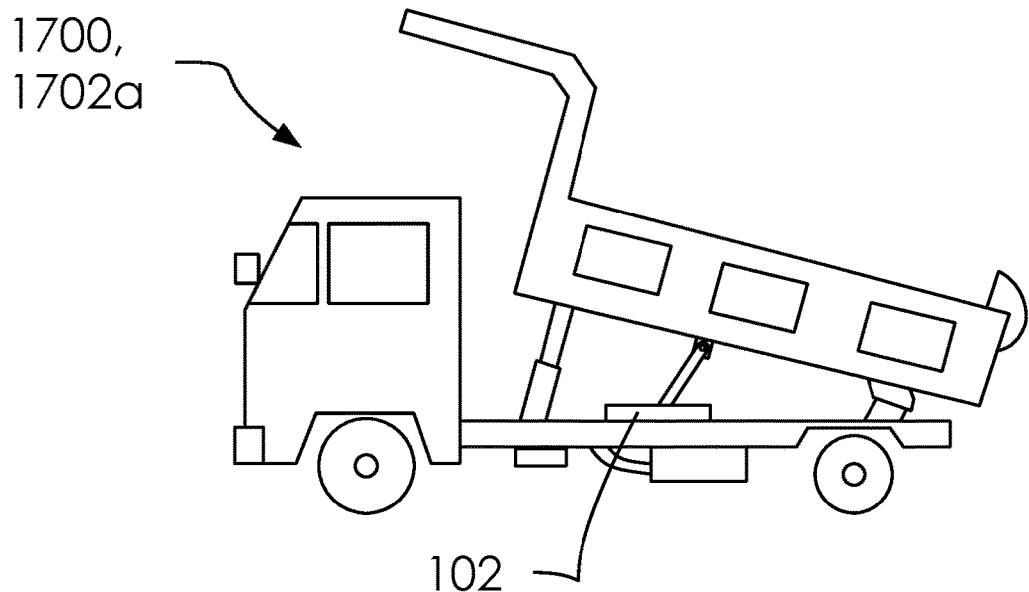

FIG. 17A illustrates an elevated front side view of tilting truck 1700 in raised configuration 1702a.

Figure 17B:
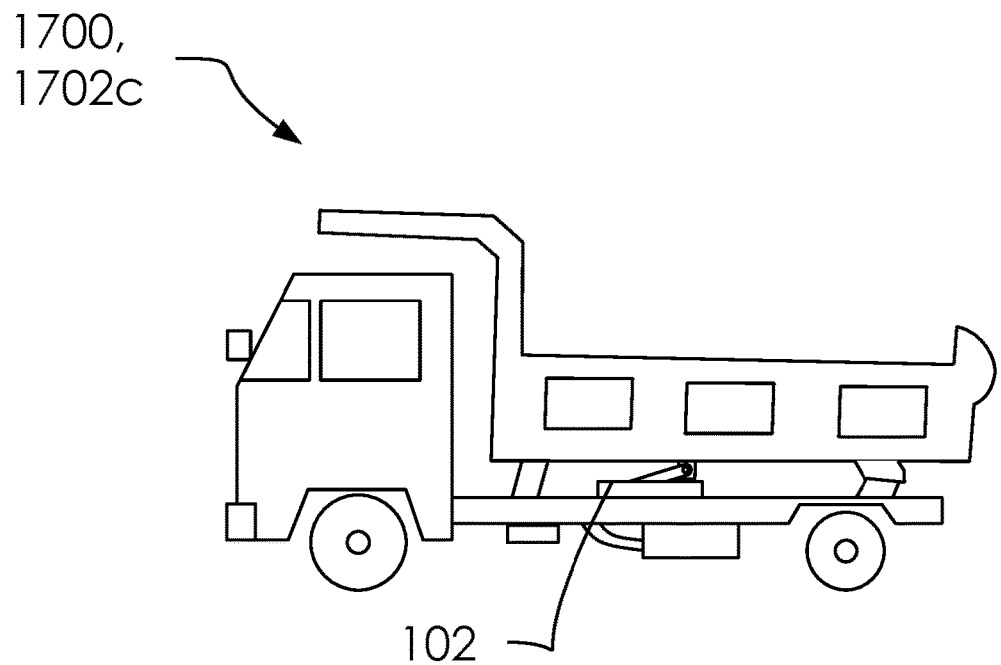
FIG. 17B illustrates an elevated front side view of tilting truck 1700 in closed configuration 1702b.

FIG. 17B illustrates an elevated front side view of tilting truck 1700 in closed configuration 1702b.

In one embodiment, said tilting truck 1700 can comprise said raised configuration 1702*a* and said closed configuration 1702*b*.

In one embodiment, said body prop assembly 102 can be used with tilting truck 1700 (such as dump trucks) with similar benefits as with a vacuum truck, as discussed above.

Figure 18:
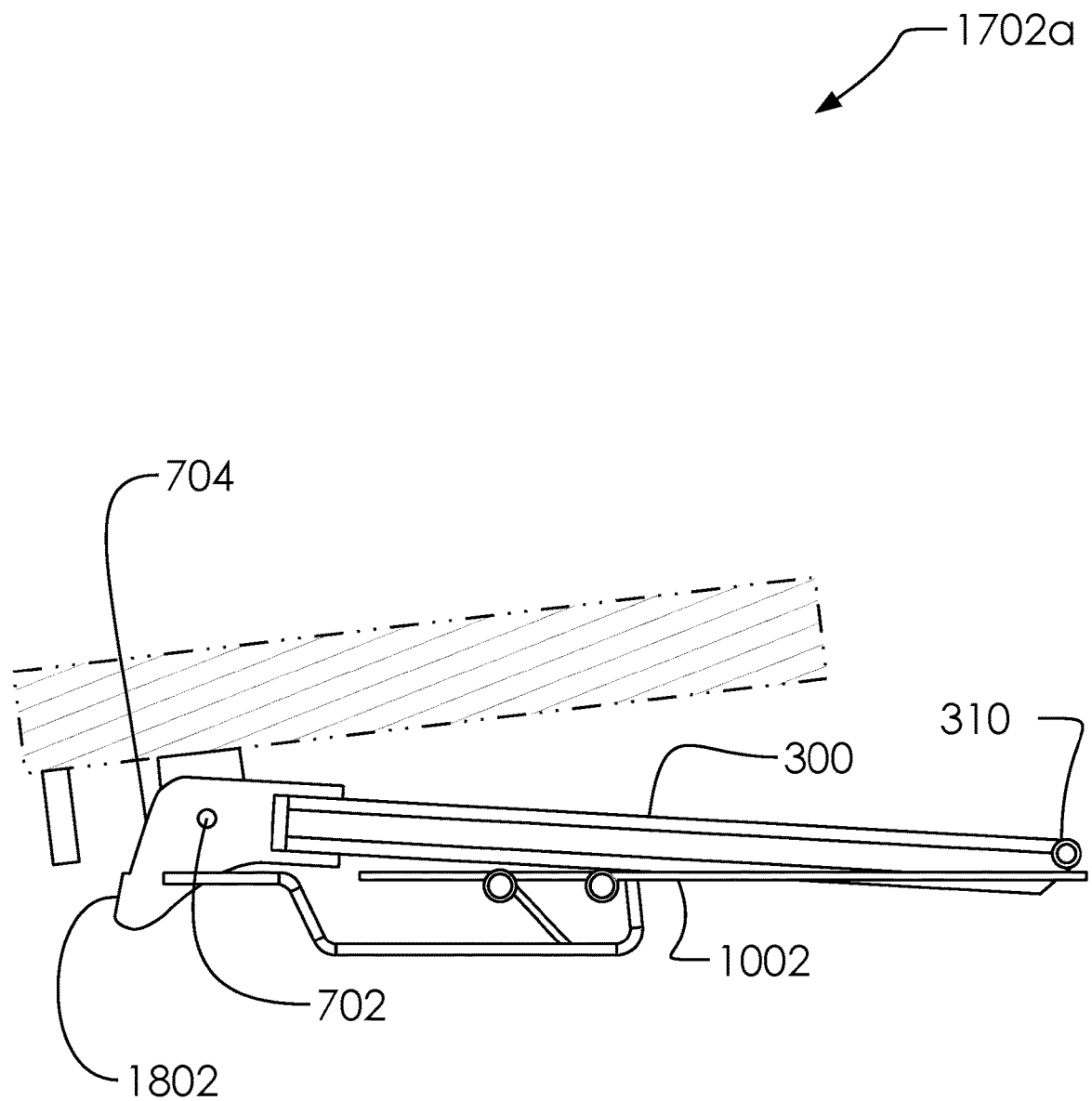

FIG. 18 illustrates an elevated front side view of raised configuration 1702*a*.

In one embodiment, said one or more tracks 704 can comprise said stopper portion 1800.

FIG. 18 and following show a progression of said body prop 300 relative to said track assembly 1002, as described herein.

Figure 19:
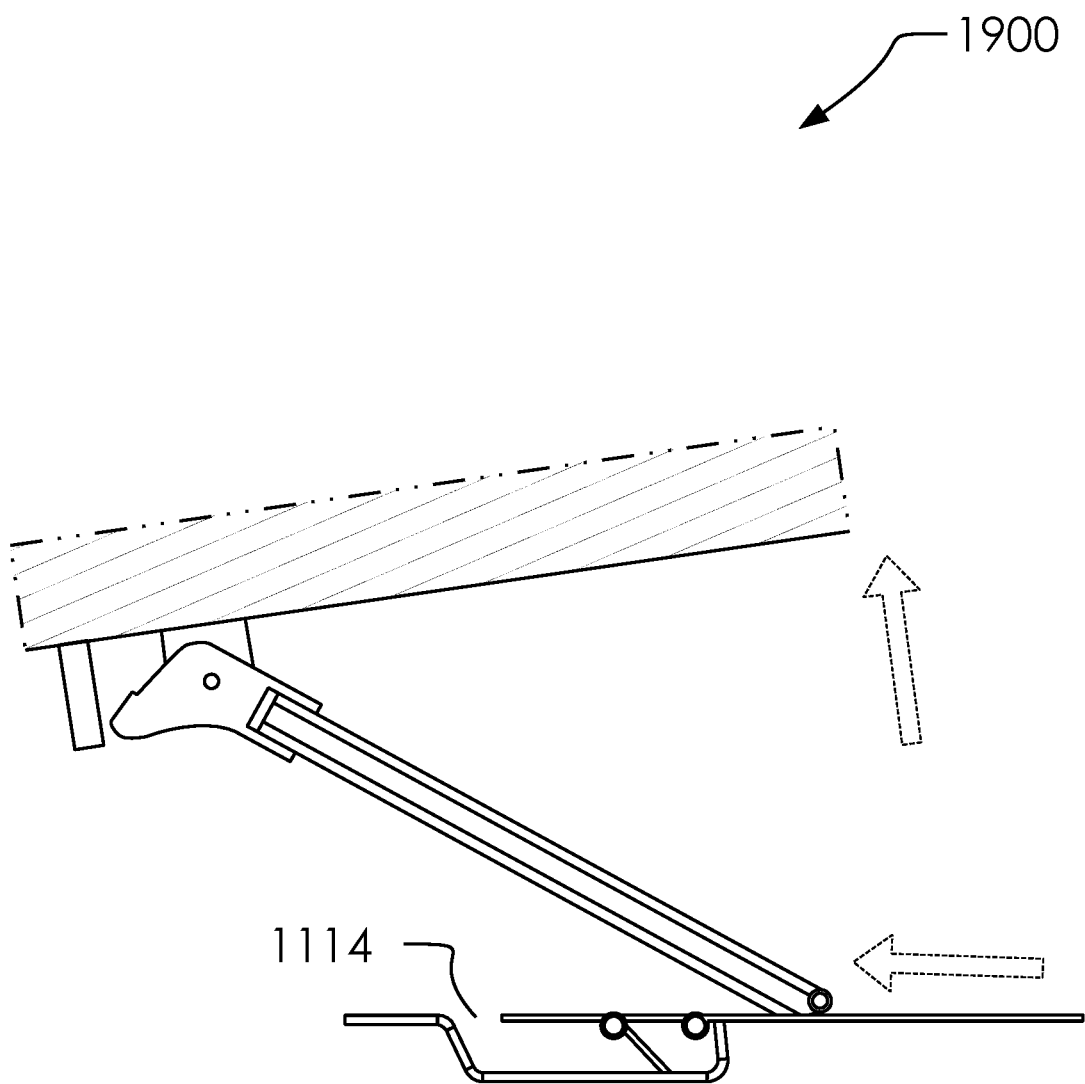
FIG. 19 illustrates an elevated front side view of first moving configuration 1900.

FIG. 19 illustrates an elevated front side view of first moving configuration 1900.

In one embodiment, said body prop assembly 102 can comprise said first moving configuration 1900.

As said tilting portions 106 raises, said body prop assembly 102 can slide forward toward said gap 1114.

Figure 20:
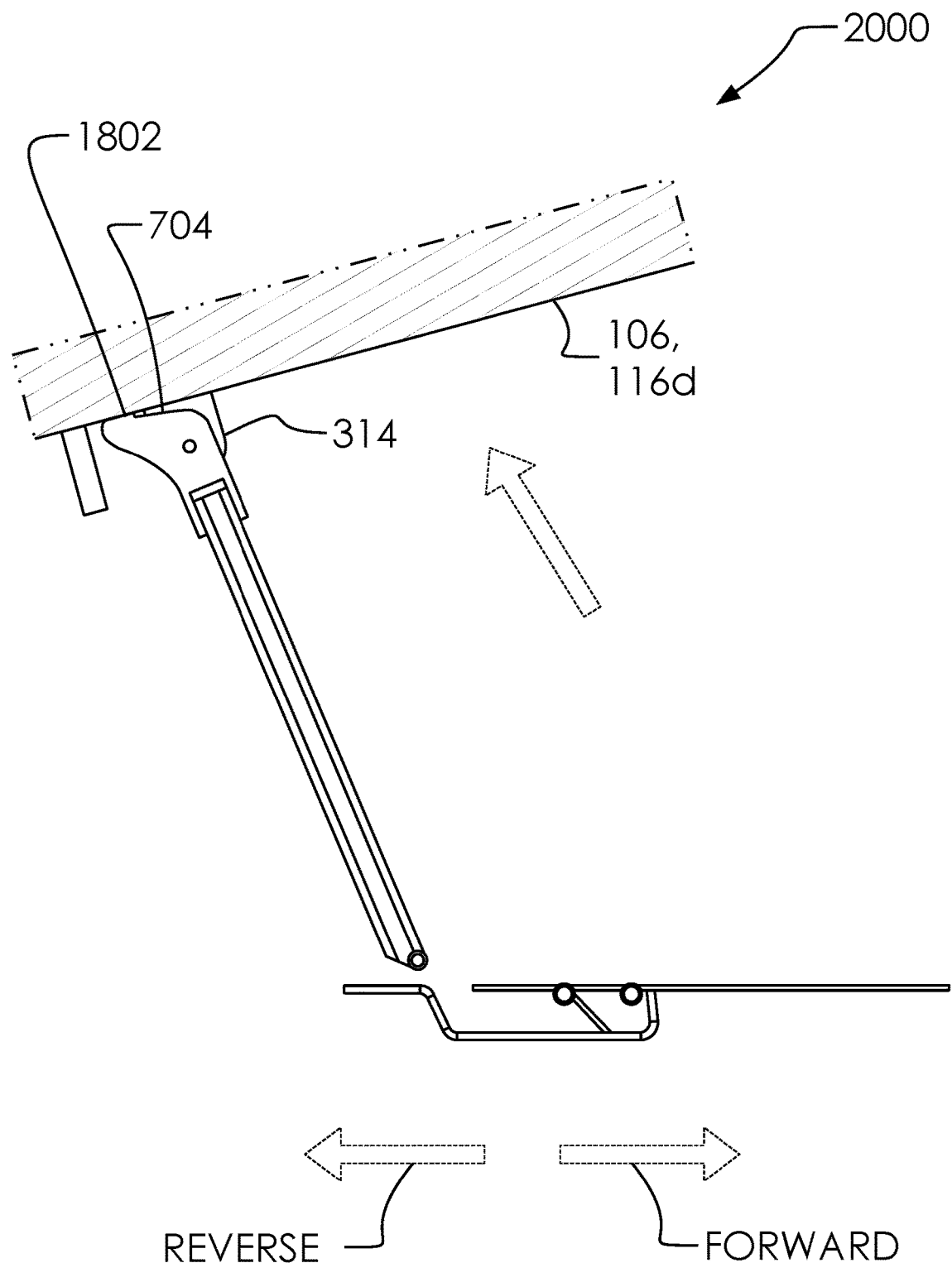
FIG. 20 illustrates an elevated front side view of fully extended configuration 2000.

FIG. 20 illustrates an elevated front side view of fully extended configuration 2000.

In one embodiment, said body prop assembly 102 can comprise said fully extended configuration 2000.

In one embodiment, said tilting portions 106 can raise sufficiently far that said lower guides 310 can lose contact with two sidetracks 306; wherein, said 1 body width 802 can press into said tilting portions 106 and said bottom 116*d* and thereby prevent rotation of said body prop 300.

Figure 21A:
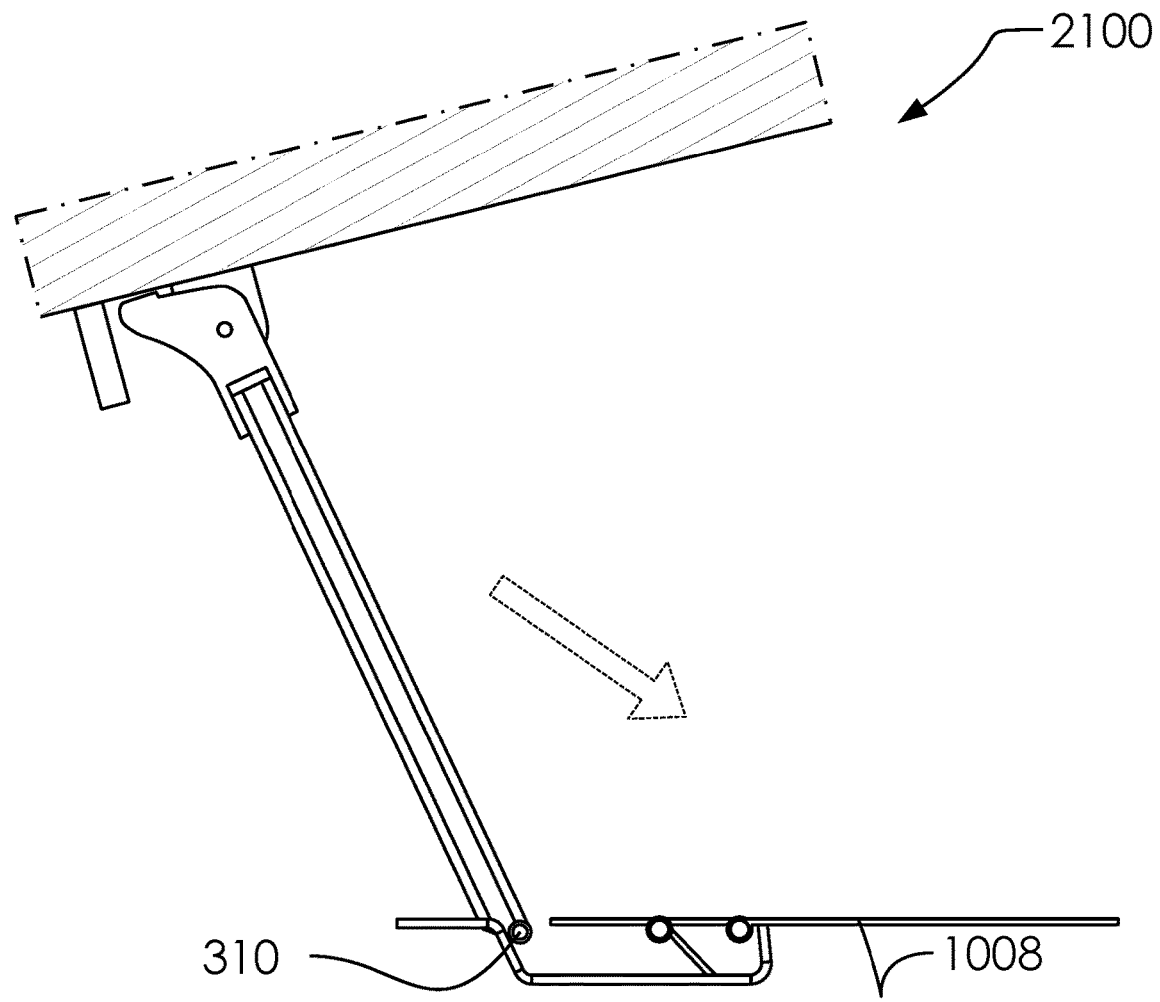
FIGS. 21A and 21B illustrate an elevated front side view of dropping configuration 2100.
Figure 21B:
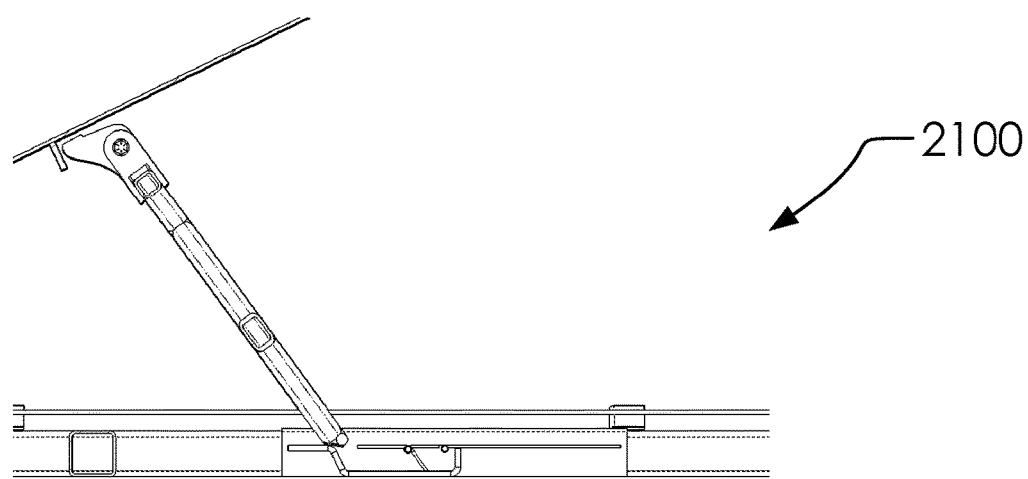

FIGS. 21A and 21B illustrate an elevated front side view of dropping configuration 2100.

In one embodiment, said body prop assembly 102 can comprise said dropping configuration 2100.

In one embodiment, said lower guides 310 can slide forward into said lower level 1008 as said tilting portions 106 are closing.

Figure 22:
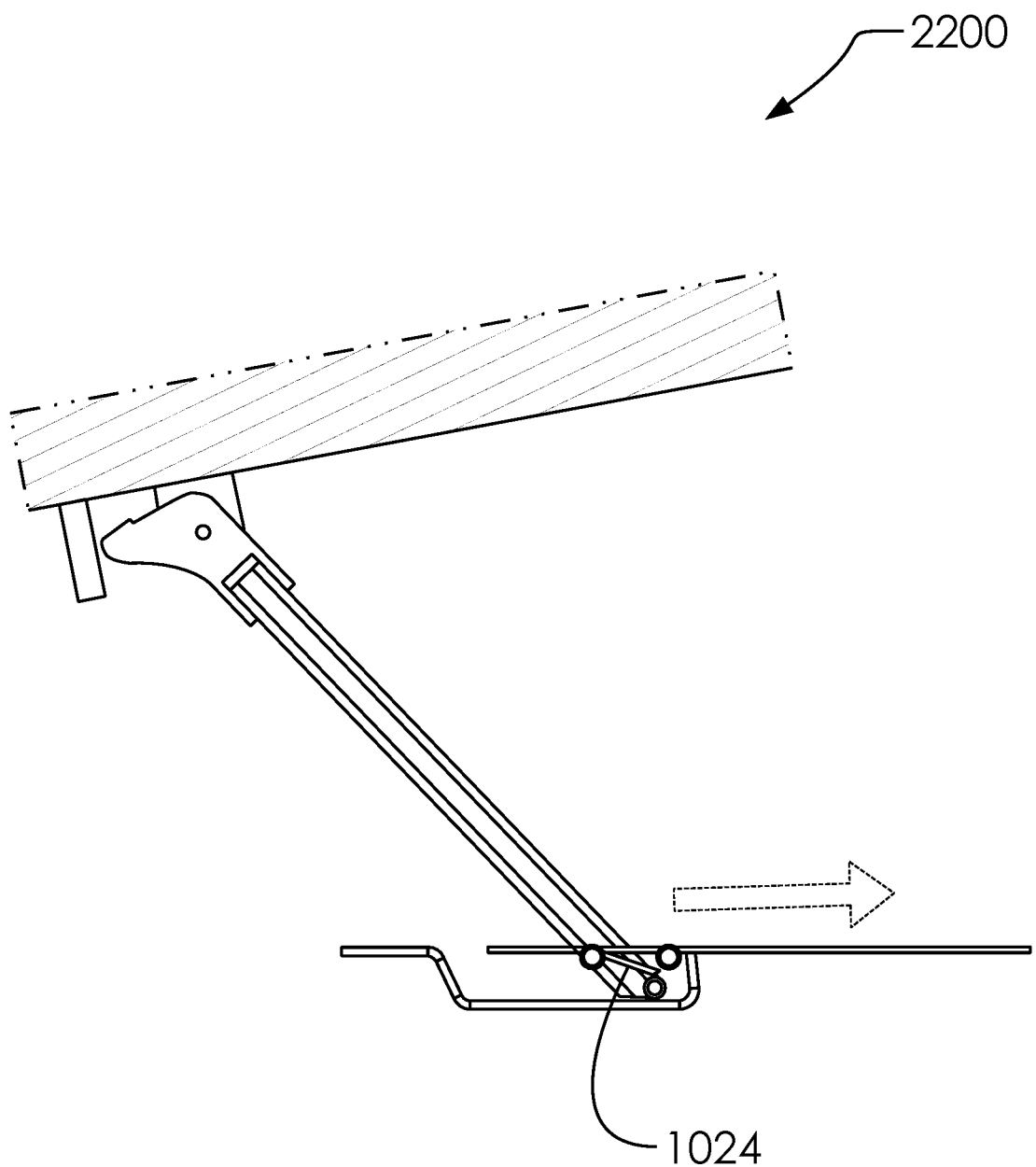
FIG. 22 illustrates an elevated front side view of passing first gate configuration 2200.

FIG. 22 illustrates an elevated front side view of passing first gate configuration 2200.

In one embodiment, said body prop assembly 102 can comprise said passing first gate configuration 2200.

Said first flap 1024 can open so as to allow said lower guides 310 to pass into said trap 1016.

Figure 23:
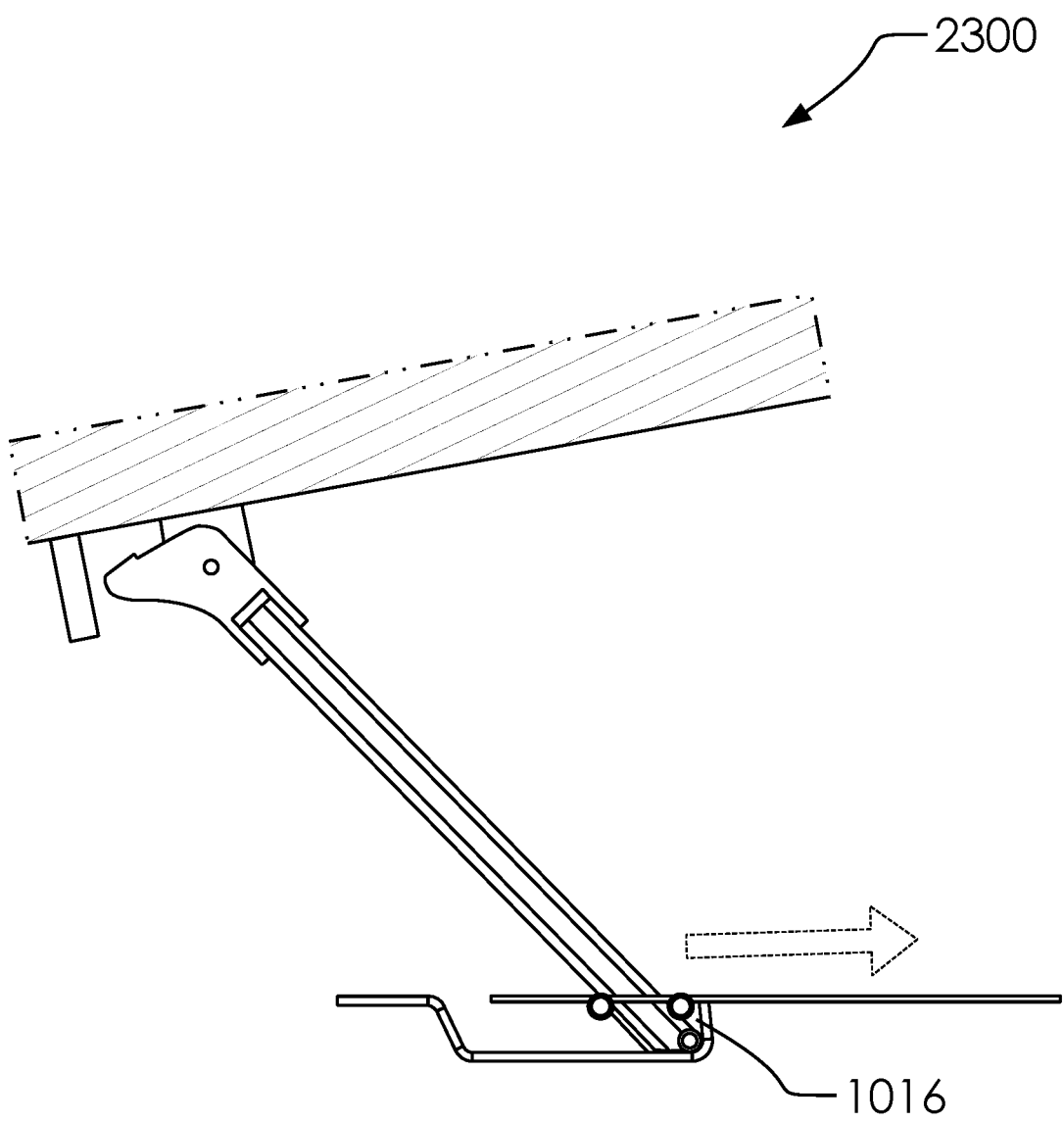
FIG. 23 illustrates an elevated front side view of trapped configuration 2300.

FIG. 23 illustrates an elevated front side view of trapped configuration 2300.

In one embodiment, said body prop assembly 102 can comprise said trapped configuration 2300.

With said lower guides 310 in said trap 1016, said tilting portions 106 can be securely held without movement; wherein, gravitational forces hold said lower guides 310 within said trap 1016 by pressing said lower guides 310 into a front portion of said trap 1016.

Figure 24:
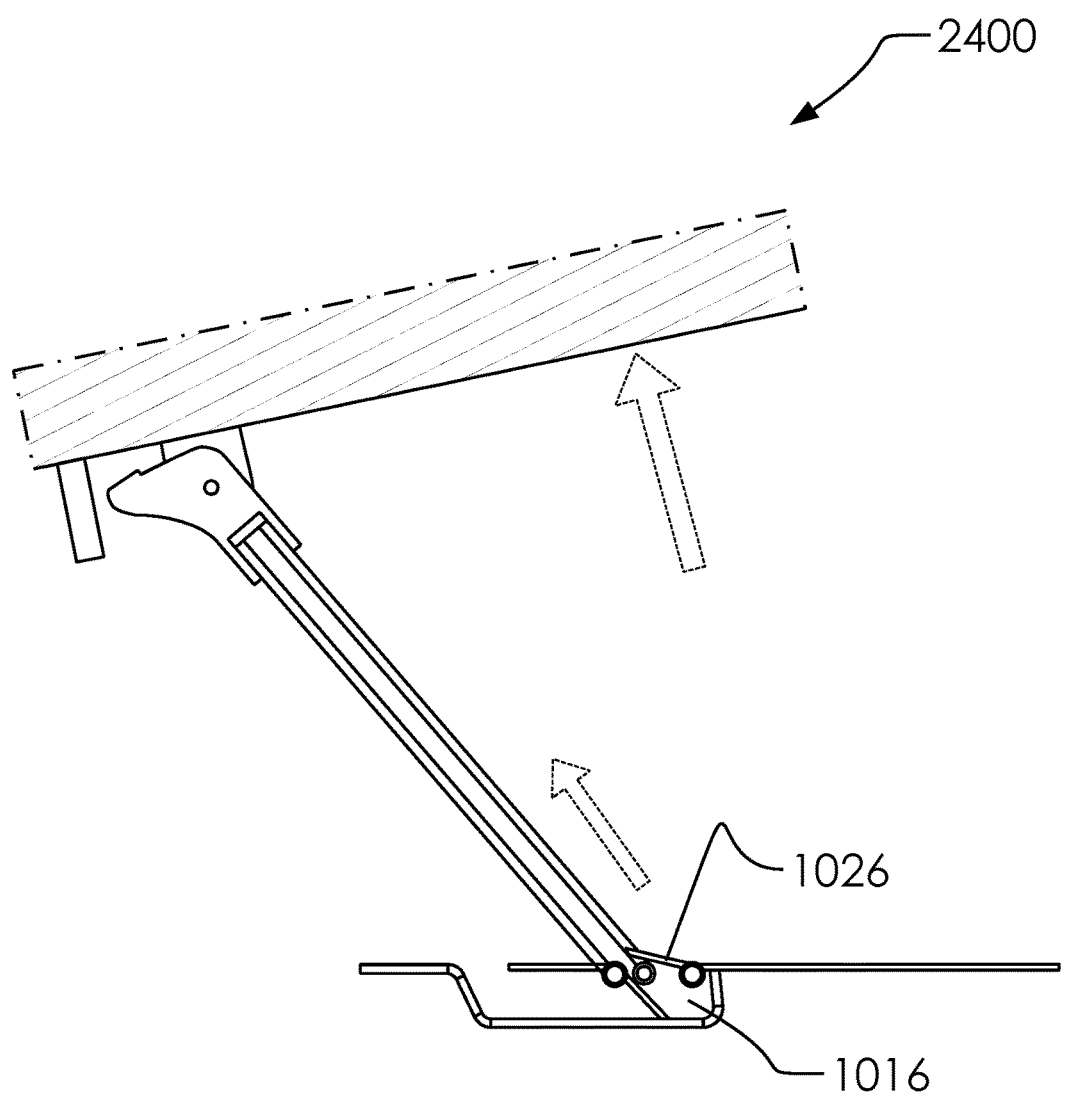
FIG. 24 illustrates an elevated front side view of trap releasing configuration 2400.

FIG. 24 illustrates an elevated front side view of trap releasing configuration 2400.

In one embodiment, said body prop assembly 102 can comprise said trap releasing configuration 2400.

In one embodiment, as said tilting portions 106 raises back up, said lower guides 310 can exit said second flap 1026 can open as lower guides 310 moves backward and up, as illustrated.

Figure 25:
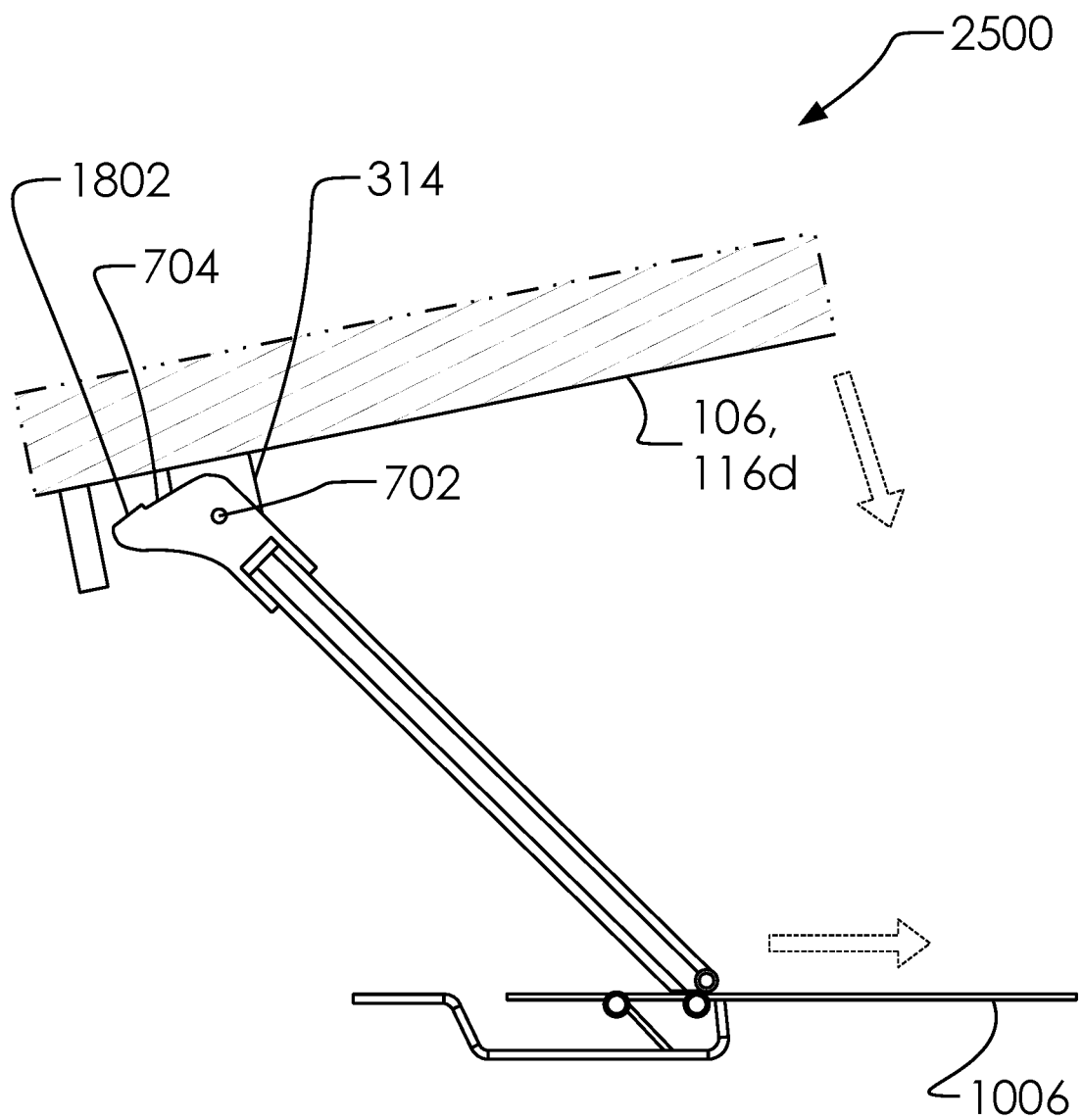
FIG. 25 illustrates an elevated front side view of resetting configuration 2500.

FIG. 25 illustrates an elevated front side view of resetting configuration 2500.

In one embodiment, said body prop assembly 102 can comprise said resetting configuration 2500.

In one embodiment, as said lower guides 310 returns to said raised configuration 1702*a*, said body prop 300 can slide forward along said upper level 1006, as illustrated The following sentences are included for completeness of this disclosure with reference to the claims.

A body prop assembly 102 for supporting portions of a tilting trailer assembly 100. Said body prop assembly 102 comprising a body prop 300, a hinge assembly 312, two sidetracks 306. Said body prop assembly 102 configured to attach to said tilting trailer assembly 100 between tilting portions 106 and a trailer platform 104. Said tilting portions 106 selectively rotates with respect to said trailer platform 104 on a tilting hinge 108. Said tilting hinge 108 defines a tilting axis 126 of said tilting trailer assembly 100. Said body prop 300 is configured to selectively hold a portion of said tilting portions 106 at an incline. Said lower guides 310 is configured to slide through portions of said two sidetracks 306 in order to adjust a lower portion of said body prop assembly 102. Said body prop 300 comprises an upper portion 322, a side portions 324 and said lower guides 310. Said upper portion 322 is substantially parallel with said lower guides 310. Said side portions 324 is substantially perpendicular to said lower guides 310. Said side portions 324 is substantially perpendicular to said upper portion 322. A prop hinge brackets 316 are attached to said upper portion 322. A vessel hinge brackets 314 are attached to a bottom 116*d* of said tilting portions 106. Said vessel hinge brackets 314 and said prop hinge brackets 316 comprise one or more hinge eyes 702 to receive a portion of a fastener assemblies 318. Said fastener assemblies 318 comprise an upper axis 320 of said body prop assembly 102. Said body prop assembly 102 and said tilting portions 106 rotate relative to one another on said upper axis 320. Said two sidetracks 306 are attached to a side portions 114 of said trailer platform 104. Said two sidetracks 306 comprise a first sidetrack 306*a* and a second sidetrack 306*b*. Said two sidetracks 306 comprise a separation width 328 between said first sidetrack 306*a* and said second sidetrack 306*b*. Said lower guides 310 comprises a width 814. Said width 814 is wider than said separation width 328. Portions of said lower guides 310 can become trapped within portions of said two sidetracks 306. Said two sidetracks 306 each comprise a L-bracket 1000 and a track assembly 1002. Said L-bracket 1000 comprise an L shaped bracket configured for attaching to said side portions 114 of said trailer platform 104. Said two sidetracks 306 comprise a guide tracks 500. Said guide tracks 500 is configured to guide portions of said lower guides 310 to adjust said body prop assembly 102 between a raised configuration 1702*a* and a closed configuration 1702*b*. Said track assembly 1002 comprise an upper level 1006 and a lower level 1008. Said upper level 1006 and said lower level 1008 are substantially parallel planes with provisions for moving said lower guides 310 freely above said upper level 1006 and selectively at said lower level 1008. Portions of said track assembly 1002 are welded to said L-bracket 1000. Said guide tracks 500 is constructed of said upper level 1006, said lower level 1008, a second flap 1026, a first flap 1024. Said guide tracks 500 defines a space above said lower level 1008 which allows said lower guides 310 to move relatively freely, a gap 1114 for allowing said lower guides 310 to pass freely below said lower level 1008 and into a lower mid portion 1018, and a trap 1016 for holding a portion of said lower guides 310. Said lower guides 310 is configured to enter said lower level 1008 through said gap 1114 between a rear upper portion 1012 and an upper mid portion 1030, slide down a rear ramp 1014, slide between said upper mid portion 1030 and said lower mid portion 1018. Slide into said trap 1016. Portions of said track assembly 1002 are configured to allow one-way movement of said lower guides 310 into and out of said trap 1016. Said lower guides 310 are configured to slide into said first flap 1024, lift a portion of said first flap 1024, slide into said trap 1016, closing said first flap 1024 behind said lower guides 310 so as to selectively hold a portion of said lower guides 310 in said trap 1016, and said lower guides 310 selectively remains in said trap 1016 provided downward force is exerted on said body prop assembly 102. Said body prop assembly 102 is configured to act as a prop for said tilting portions 106. Removing a portion of said lower guides 310 from said trap 1016 comprises reversing said lower guides 310 into a portion of said first flap 1024, sliding up said first flap 1024, opening said second flap 1026, and sliding said lower guides 310 out of said lower level 1008 and onto or above said upper level 1006. Said first flap 1024 is configured to selectively pivot on a first hinge 1020. Said second flap 1026 is configured to selectively pivot on a second hinge 1022. Said body prop assembly 102 is configured to lift said lower guides 310 entirely off of said two sidetracks 306 with said tilting portions 106 raised sufficiently above said lower guides 310. With said lower guides 310 lifted off of said two sidetracks 306, a body width 802/are configured to press into said bottom 116d of said tilting portions 106 and thereby prevent rotation of said body prop 300. A body prop assembly 102 for supporting portions of a tilting trailer assembly 100.

Said body prop assembly 102 comprising a body prop 300, a hinge assembly 312, two sidetracks 306. Said body prop assembly 102 configured to attach to said tilting trailer assembly 100 between tilting portions 106 and a trailer platform 104. Said tilting portions 106 selectively rotates with respect to said trailer platform 104 on a tilting hinge 108. Said tilting hinge 108 defines a tilting axis 126 of said tilting trailer assembly 100. Said body prop 300 is configured to selectively hold a portion of said tilting portions 106 at an incline. Said lower guides 310 is configured to slide through portions of said two sidetracks 306 in order to adjust a lower portion of said body prop assembly 102. Said body prop 300 comprises an upper portion 322, a side portions 324 and said lower guides 310. A prop hinge brackets 316 are attached to said upper portion 322. A vessel hinge brackets 314 are attached to a bottom 116d of said tilting portions 106. Said body prop assembly 102 and said tilting portions 106 rotate relative to one another on an upper axis 320. Said two sidetracks 306 are attached to a side portions 114 of said trailer platform 104. Said two sidetracks 306 comprise a first sidetrack 306a and a second sidetrack 306b. Said two sidetracks 306 comprise a guide tracks 500. Said guide tracks 500 is configured to guide portions of said lower guides 310 to adjust said body prop assembly 102 between a raised configuration 1702a and a closed configuration 1702b.

Said body prop 300 comprises a metal sufficient to hold a portion of the weight of a portion of said tilting portions 106.

Said body prop 300 comprises a set of framed elements. Said body prop 300 comprises said upper portion 322 at a top portion. Said upper portion 322 is substantially parallel with said lower guides 310. Said side portions 324 is perpendicular to said lower guides 310. Said side portions 324 is perpendicular to said upper portion 322. A central support portions 326 is configured to reinforce and fill a portion of a space between said side portions 324, said lower guides 310 and said upper portion 322.

Said body prop 300 comprises a solid piece. Said body prop 300 comprises said upper portion 322 at a top portion. Said upper portion 322 is substantially parallel with said lower guides 310. A central support portions 326 is configured to reinforce and fill a portion of a space between said side portions 324, said lower guides 310 and said upper portion 322.

Said body prop assembly 102, said tilting portions 106 and said trailer platform 104 form a triangle from an elevated side view consisting of said hinge assembly 312 as a first top hinge angle 610a, said upper axis 320 as a tilting hinge angles 608 and said lower guides 310 forming a sliding third angle. Said body prop assembly 102 comprises a second leg 604. A portion of said tilting trailer assembly 100 between said tilting hinge 108 and said hinge assembly 312 comprises a first leg 602. A distance between said tilting hinge 108 and said lower guides 310 comprises a variable distance comprising a first lower leg 606a. Said tilting trailer assembly 100 comprise at least a raised and locked position 400a, a transitioning position 400b and a closed position 400c. Wherein, said closed position 400c comprises said body prop assembly 102 supporting said tilting portions 106. Wherein, said transitioning position 400b comprises said body prop assembly 102 in transition between said raised and locked position 400a and said closed position 400c. Wherein, said raised and locked position 400a comprises said body prop assembly 102 collapsed and said first top hinge angle 610a being substantially 180 degrees and a first tilting hinge angle 608a being substantially zero degrees.

Said two sidetracks 306 each comprise said L-bracket 1000 and a track assembly 1002. Said L-bracket 1000 comprise an L shaped bracket configured for attaching to said side portions 114 of said trailer platform 104. Said two sidetracks 306 comprise a separation width 328 between said first sidetrack 306a and said second sidetrack 306b. Said lower guides 310 comprises a width 814. Said width 814 is wider than said separation width 328. Portions of said lower guides 310 can become trapped within portions of said two sidetracks 306.

Said two sidetracks 306 each comprise said L-bracket 1000 and a track assembly 1002. Said L-bracket 1000 comprise an L shaped bracket configured for attaching to said side portions 114 of said trailer platform 104.

Said two sidetracks 306 comprise a separation width 328 between said first sidetrack 306a and said second sidetrack 306b. Said lower guides 310 comprises a width 814. Said width 814 is wider than said separation width 328. Portions of said lower guides 310 can become trapped within portions of said two sidetracks 306.

A fastener assemblies 318 comprise said upper axis 320 of said body prop assembly 102.

Said vessel hinge brackets 314 and said prop hinge brackets 316 comprise one or more hinge eyes 702 to receive a portion of a fastener assemblies 318.

A track assembly 1002 comprise an upper level 1006 and a lower level 1008. Said upper level 1006 and said lower level 1008 are substantially parallel planes with provisions for moving said lower guides 310 freely above said upper level 1006 and selectively at said lower level 1008. Portions of said track assembly 1002 are welded to said L-bracket 1000. Said guide tracks 500 is constructed of said upper level 1006, said lower level 1008, a second flap 1026, a first flap 1024. Said guide tracks 500 defines a space above said lower level 1008 which allows said lower guides 310 to move relatively freely, a gap 1114 for allowing said lower guides 310 to pass freely below said lower level 1008 and into a lower mid portion 1018, and a trap 1016 for holding a portion of said lower guides 310. Said lower guides 310 is configured to enter said lower level 1008 through said gap 1114 between a rear upper portion 1012 and an upper mid portion 1030, slide down a rear ramp 1014, slide between said upper mid portion 1030 and said lower mid portion 1018. Slide into said trap 1016. Portions of said track assembly 1002 are configured to allow one-way movement of said lower guides 310 into and out of said trap 1016. Said lower guides 310 are configured to slide into said first flap 1024, lift a portion of said first flap 1024, slide into said trap 1016, closing said first flap 1024 behind said lower guides 310 so as to selectively hold a portion of said lower guides 310 in said trap 1016, and said lower guides 310 selectively remains in said trap 1016 provided downward force is exerted on said body prop assembly 102. Said body prop assembly 102 is configured to act as a prop for said tilting portions 106. Removing a portion of said lower guides 310 from said trap 1016 comprises reversing said lower guides 310 into a portion of said first flap 1024, sliding up said first flap 1024, opening said second flap 1026, and sliding said lower guides 310 out of said lower level 1008 and onto or above said upper level 1006. Said first flap 1024 is configured to selectively pivot on a first hinge 1020. Said second flap 1026 is configured to selectively pivot on a second hinge 1022. Said body prop assembly 102 is configured to lift said lower guides 310 entirely off of said two sidetracks 306 with said tilting portions 106 raised sufficiently above said lower guides 310. With said lower guides 310 lifted off of said two sidetracks 306, a body width 802/are configured to press into said bottom 116d of said tilting portions 106 and thereby prevent rotation of said body prop 300.

Said upper portion 322 is substantially parallel with said lower guides 310. Said side portions 324 is substantially perpendicular to said lower guides 310. Said side portions 324 is substantially perpendicular to said upper portion 322.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A body prop assembly for supporting portions of a tilting trailer assembly, wherein:
    said body prop assembly comprising a body prop, a hinge assembly, and two sidetracks;
    said tilting trailer assembly comprises tilting portions and a trailer platform;
    said body prop assembly is configured to attach to said tilting trailer assembly between said tilting portions and said trailer platform;
    said tilting portions are configured to selectively rotate with respect to said trailer platform on a tilting hinge;
    said tilting hinge defines a tilting axis of said tilting trailer assembly;
    said body prop is configured to selectively hold a portion of said tilting portions at an incline;
    said body prop assembly further comprises lower guides configured to slide through portions of said two sidetracks in order to adjust a lower portion of said body prop assembly;
    said body prop comprises an upper portion, and a side portions;
    said upper portion of said body prop is substantially parallel with said lower guides;
    said side portions are substantially perpendicular to said lower guides;
    said hinge assembly comprises prop hinge brackets and vessel hinge brackets;
    said prop hinge brackets are attached to said upper portion;
    said vessel hinge brackets are attached to a bottom of said tilting portions;
    said vessel hinge brackets and said prop hinge brackets each comprise one or more hinge eyes and fastener assemblies;
    said one or more hinge eyes are configured to receive a portion of a fastener assembly;
    said fastener assemblies comprise an upper axis of said body prop assembly;
    said body prop assembly and said tilting portions rotate relative to one another on said upper axis;
    said two sidetracks are attached to side portions of said trailer platform;
    said two sidetracks comprise a first sidetrack and a second sidetrack;
    said two sidetracks comprise a separation width between said first sidetrack and said second sidetrack;
    said lower guides comprise a width;
    said width of said lower guides is wider than said separation width;
    portions of said lower guides are configured to become trapped within portions of said two sidetracks;
    said two sidetracks each comprise an L-bracket and a track assembly;
    each said L-bracket is configured for attaching to said side portions of said trailer platform;
    each of said two sidetracks is configured to guide portions of said lower guides and thereby to adjust said body prop assembly between a raised configuration and a closed configuration;
    each said track assembly comprise an upper level and a lower level, a second flap, a first flap;
    said upper level and said lower level are substantially parallel planes with provisions for moving said lower guides freely above said upper level and selectively at said lower level;
    portions of each said track assembly are welded to said L-bracket;
    each said track assembly is configured with
        a space above said lower level which allows said lower guides to move relatively freely,
        a gap for allowing said lower guides to pass freely below said upper level and into a lower mid portion, and
        a trap for holding a portion of said lower guides;
    with reference to each said track assembly, said lower guides are configured to
        enter said lower level through said gap between a rear upper portion and an upper mid portion,
        slide down a rear ramp,
        slide between said upper mid portion and said lower mid portion, and
        slide into said trap;
    portions of each said track assembly are configured to allow one-way movement of said lower guides into and out of said trap;

said lower guides are configured to
  slide into said first flap,
  lift a portion of said first flap,
  slide into said trap,
  be held in said trap by closing said first flap behind said lower guides, and remain in said trap provided downward force is exerted on said body prop assembly;
said body prop assembly is configured to act as a prop for said tilting portions;
said body prop assembly is configured to selectively allow
  a portion of said lower guides out of said trap when
  a portion of said first flap is pressed reversed into said lower guides,
  said first flap slides up,
  said second flap opens, and
  said lower guides slide out of said lower level and onto or above said upper level;
said first flap is configured to selectively pivot on a first hinge;
said second flap is configured to selectively pivot on a second hinge;
said body prop assembly is configured to lift said lower guides entirely off of said two sidetracks with said tilting portions raised sufficiently above said lower guides; and
with said lower guides lifted off said two sidetracks, a body width is configured to press into said bottom of said tilting portions and thereby prevent rotation of said body prop.

2. A body prop assembly for supporting portions of a tilting trailer assembly, wherein:
  said body prop assembly comprising a body prop, a hinge assembly, and two sidetracks;
  said tilting trailer assembly comprises tilting portions and a trailer platform;
  said body prop assembly is configured to attach to said tilting trailer assembly between said tilting portions and said trailer platform;
  said tilting portions are configured to selectively rotate with respect to said trailer platform on a tilting hinge;
  said tilting hinge defines a tilting axis of said tilting trailer assembly;
  said body prop is configured to selectively hold a portion of said tilting portions at an incline;
  said body prop assembly further comprises lower guides configured to slide through portions of said two sidetracks in order to adjust a lower portion of said body prop assembly;
  said body prop comprises an upper portion, and a side portions;
  said hinge assembly comprises prop hinge brackets and vessel hinge brackets;
  said prop hinge brackets are attached to said upper portion;
  said vessel hinge brackets are attached to a bottom of said tilting portions;
  said vessel hinge brackets and said prop hinge brackets each comprise one or more hinge eyes and fastener assemblies;
  said body prop assembly and said tilting portions rotate relative to one another on an upper axis;
  said two sidetracks are attached to side portions of said trailer platform;
  said two sidetracks comprise a first sidetrack and a second sidetrack;
  each of said two sidetracks is configured to guide portions of said lower guides and thereby to adjust said body prop assembly between a raised configuration and a closed configuration;
  said two sidetracks each comprise a track assembly;
  each said track assembly comprise an upper level and a lower level, a second flap, a first flap;
  said upper level and said lower level are substantially parallel planes with provisions for moving said lower guides freely above said upper level and selectively at said lower level;
  portions of each said track assembly are welded to an L-bracket;
  each said track assembly are configured with
    a space above said lower level which allows said lower guides to move relatively freely,
    a gap for allowing said lower guides to pass freely below said upper level and into a lower mid portion, and
    a trap for holding a portion of said lower guides;
  with reference to each said track assembly, said lower guides are configured to
    enter said lower level through said gap between a rear upper portion and an upper mid portion,
    slide down a rear ramp,
    slide between said upper mid portion and said lower mid portion;
    slide into said trap;
  portions of each said track assembly are configured to allow one-way movement of said lower guides into and out of said trap;
  said lower guides are configured to
    slide into said first flap,
    lift a portion of said first flap,
    slide into said trap,
    be held within said trap by closing said first flap behind said lower guides, and
    remain in said trap provided downward force is exerted on said body prop assembly;
  said body prop assembly is configured to act as a prop for said tilting portions;
  said body prop assembly is configured to selectively allow
    a portion of said lower guides out of said trap when
    a portion of said first flap is pressed reversed into said lower guides,
    said first flap slides up,
    said second flap opens, and
    said lower guides slide out of said lower level and onto or above said upper level;
  said first flap is configured to selectively pivot on a first hinge;
  said second flap is configured to selectively pivot on a second hinge;
  said body prop assembly is configured to lift said lower guides entirely off of said two sidetracks with said tilting portions raised sufficiently above said lower guides; and
  with said lower guides lifted off said two sidetracks, a body width is configured to press into said bottom of said tilting portions and thereby prevent rotation of said body prop.

3. The body prop assembly from claim 2, wherein:
  said body prop comprises a metal sufficient to hold a portion of the weight of a portion of said tilting portions.

4. The body prop assembly from claim 2, wherein:
said body prop comprises a set of framed elements;
said body prop comprises said upper portion at a top portion;
said upper portion is substantially parallel with said lower guides;
said side portions are perpendicular to said lower guides;
said side portions are perpendicular to said upper portion; and
central support portions are configured to reinforce and fill a portion of a space between said side portions, said lower guides and said upper portion.

5. The body prop assembly from claim 2, wherein:
said body prop comprises a solid piece;
said body prop comprises said upper portion at a top portion;
said upper portion is substantially parallel with said lower guides; and
central support portions are configured to reinforce and fill a portion of a space between said side portions, said lower guides and said upper portion.

6. The body prop assembly from claim 2, wherein:
said body prop assembly forms a side of a triangle with said tilting portions and said trailer platform;
said triangle comprises
a first angle comprising a first top hinge angle at said hinge assembly,
a second angle comprising a tilting hinge angle at said upper axis, and
a third angle comprising a sliding third angle at said lower guides;
said triangle further comprises
a first leg comprising a portion of said tilting trailer assembly between said tilting hinge and said hinge assembly comprises,
a second leg comprising said body prop assembly, and
a third leg comprising a portion of said trailer platform;
said first leg comprises a variable distance between said tilting hinge and said lower guides;
said tilting trailer assembly comprises at least a raised and locked position, a transitioning position and a closed position;
wherein, said closed position comprises said body prop assembly supporting said tilting portions;
wherein, said transitioning position comprises said body prop assembly in transition between said raised and locked position and said closed position; and
wherein, said raised and locked position comprises said body prop assembly collapsed and said first top hinge angle being substantially 180 degrees and a first tilting hinge angle being substantially zero degrees.

7. The body prop assembly from claim 2, wherein:
said two sidetracks each comprise said L-bracket and said track assembly;
said L-bracket is configured for attaching to said side portions of said trailer platform;
said two sidetracks comprise a separation width between said first sidetrack and said second sidetrack;
said lower guides comprises a width;
said width is wider than said separation width; and
portions of said lower guides are configured to become trapped within portions of said two sidetracks.

8. The body prop assembly from claim 2, wherein:
said two sidetracks each comprise an L-bracket and said track assembly; and
said L-bracket is configured for attaching to said side portions of said trailer platform.

9. The body prop assembly from claim 2, wherein:
said two sidetracks comprise a separation width between said first sidetrack and said second sidetrack;
said lower guides comprises a width;
said width is wider than said separation width; and
portions of said lower guides are configured to become trapped within portions of said two sidetracks.

10. The body prop assembly from claim 2, wherein:
said fastener assemblies comprise said upper axis of said body prop assembly.

11. The body prop assembly from claim 2, wherein:
said vessel hinge brackets and said prop hinge brackets comprise one or more hinge eyes to receive a portion of said fastener assemblies.

12. The body prop assembly from claim 2, wherein:
said upper portion is substantially parallel with said lower guides;
said side portions are substantially perpendicular to said lower guides; and
said side portions are substantially perpendicular to said upper portion.

13. A body prop assembly for supporting portions of a tilting trailer assembly, wherein:
said body prop assembly comprising a body prop, a hinge assembly, and two sidetracks;
said tilting trailer assembly comprises tilting portions and a trailer platform;
said body prop assembly is configured to attach to said tilting trailer assembly between said tilting portions and said trailer platform;
said tilting portions are configured to selectively rotate with respect to said trailer platform on a tilting hinge;
said tilting hinge defines a tilting axis of said tilting trailer assembly;
said body prop is configured to selectively hold a portion of said tilting portions at an incline;
said body prop assembly further comprises lower guides configured to slide through portions of said two sidetracks in order to adjust a lower portion of said body prop assembly;
said body prop comprises an upper portion, and a side portions;
said hinge assembly comprises prop hinge brackets and vessel hinge brackets;
said prop hinge brackets are attached to said upper portion;
said vessel hinge brackets are attached to a bottom of said tilting portions;
said vessel hinge brackets and said prop hinge brackets each comprise one or more hinge eyes and fastener assemblies;
said body prop assembly and said tilting portions rotate relative to one another on an upper axis;
said two sidetracks are attached to side portions of said trailer platform;
said two sidetracks comprise a first sidetrack and a second sidetrack;
each of said two sidetracks is configured to guide portions of said lower guides and thereby to adjust said body prop assembly between a raised configuration and a closed configuration;
said two sidetracks each comprise a track assembly;
each said track assembly comprises an upper level and a lower level;
each said track assembly comprises a first flap and a second flap;

said upper level and said lower level are in substantially parallel planes with provisions for moving said lower guides freely above said upper level and selectively at said lower level;

each said track assembly is configured with
- a space above said lower level which allows said lower guides to move relatively freely,
- a gap for allowing said lower guides to pass freely below said upper level and into a lower mid portion, and
- a trap for holding a portion of said lower guides;

with reference to each said track assembly, said lower guides are configured to
- enter said lower level through said gap between a rear upper portion and an upper mid portion,
- slide down a rear ramp,
- slide between said upper mid portion and said lower mid portion;
- slide into said trap;

said lower guides are configured to
- slide into said first flap,
- lift a portion of said first flap,
- slide into said trap,
- be held in said trap by closing said first flap behind said lower guides, and
- remain in said trap provided downward force is exerted on said body prop assembly; and said body prop assembly is configured to act as a prop for said tilting portions.

14. The body prop assembly from claim 13, wherein:
portions of each said track assembly are welded to an L-bracket.

15. The body prop assembly from claim 13, wherein:
said first flap is configured to selectively pivot on a first hinge;
said second flap is configured to selectively pivot on a second hinge.

16. The body prop assembly from claim 13, wherein:
said body prop assembly is configured to lift said lower guides entirely off of said two sidetracks with said tilting portions raised sufficiently above said lower guides; and
with said lower guides lifted off said two sidetracks, a body width is configured to press into said bottom of said tilting portions and thereby prevent rotation of said body prop.

17. The body prop assembly from claim 13, wherein:
portions of each said track assembly are configured to allow one-way movement of said lower guides into and out of said trap.

18. The body prop assembly from claim 13, wherein:
said body prop assembly is configured to selectively allow a portion of said lower guides out of said trap when
a portion of said first flap is pressed reversed into said lower guides,
said first flap slides up,
said second flap opens, and
said lower guides slide out of said lower level and onto or above said upper level.

* * * * *